(12) United States Patent
Kim et al.

(10) Patent No.: US 10,966,211 B2
(45) Date of Patent: Mar. 30, 2021

(54) METHOD AND APPARATUS FOR ALLOCATING RESOURCES TO FDR-MODE UE IN A WIRELESS COMMUNICATION SYSTEM

(71) Applicant: LG ELECTRONICS INC., Seoul (KR)

(72) Inventors: Dongkyu Kim, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 16/301,704

(22) PCT Filed: Jan. 20, 2017

(86) PCT No.: PCT/KR2017/000732
§ 371 (c)(1),
(2) Date: Nov. 14, 2018

(87) PCT Pub. No.: WO2017/217630
PCT Pub. Date: Dec. 21, 2017

(65) Prior Publication Data
US 2020/0163090 A1    May 21, 2020

Related U.S. Application Data

(60) Provisional application No. 62/348,957, filed on Jun. 12, 2016.

(51) Int. Cl.
*H04W 72/08* (2009.01)
*H04L 1/18* (2006.01)
(Continued)

(52) U.S. Cl.
CPC ......... *H04W 72/082* (2013.01); *H04L 1/0003* (2013.01); *H04L 1/1819* (2013.01);
(Continued)

(58) Field of Classification Search
None
See application file for complete search history.

(56) References Cited

U.S. PATENT DOCUMENTS 8,503,364 B2 * 8/2013 Zhang ................. H04W 52/146
                                                370/328
8,995,377 B2 * 3/2015 Wang ..................... H04L 5/001
                                                370/329
(Continued)

FOREIGN PATENT DOCUMENTS

WO    2014092365    6/2014
WO    2015105208    7/2015
(Continued)

OTHER PUBLICATIONS

PCT International Application No. PCT/KR2017/000732, Notification of Transmittal of the International Search Report and the Written Opinion of the International Searching Authority, or Declaration dated May 8, 2017, 11 pages.
(Continued)

*Primary Examiner* — Gregory B Sefcheck
(74) *Attorney, Agent, or Firm* — Lee Hong Degerman Kang Waimey

(57) ABSTRACT

A method for receiving resource allocation information by a user equipment in a wireless communication system, the method comprising receiving, from a base station, control information including downlink resource allocation information and an indicator indicating downlink resource allocation for the user equipment operating in Full Duplex Radio (FDR) mode, wherein the downlink resource alloca-
(Continued)

tion information indicates at least one first Resource Block Group (RBG) index, each of the at least one RBG index corresponding to a plurality of non-contiguous Physical Resource Block (PRB) indexes in a frequency domain, and receiving, from the base station, downlink data based on the downlink resource allocation information and based on the indicator.

14 Claims, 21 Drawing Sheets

(51) Int. Cl.
    *H04L 5/14* (2006.01)
    *H04L 5/16* (2006.01)
    *H04L 1/00* (2006.01)
    *H04L 5/00* (2006.01)

(52) U.S. Cl.
    CPC .......... *H04L 5/0048* (2013.01); *H04L 5/0055* (2013.01); *H04L 5/14* (2013.01); *H04L 5/1461* (2013.01); *H04L 5/16* (2013.01)

(56) References Cited

U.S. PATENT DOCUMENTS

| | | | | |
|---|---|---|---|---|
| 9,014,065 | B2 * | 4/2015 | Yang | H04L 5/14 370/280 |
| 9,236,996 | B2 * | 1/2016 | Khandani | H04L 5/1423 |
| 9,397,814 | B2 * | 7/2016 | Yang | H04J 3/00 |
| 9,414,373 | B2 * | 8/2016 | Park | H04W 72/042 |
| 9,467,993 | B2 * | 10/2016 | Seo | H04W 72/042 |
| 9,686,056 | B2 * | 6/2017 | Wang | H04L 1/1812 |
| 9,756,625 | B2 * | 9/2017 | Liu | H04L 5/0007 |
| 9,825,752 | B2 * | 11/2017 | Jindal | H04L 1/16 |
| 9,838,193 | B2 * | 12/2017 | Kazmi | H04L 5/0044 |
| 9,872,303 | B2 * | 1/2018 | Suzuki | H04W 72/1226 |
| 9,949,265 | B2 * | 4/2018 | Dinan | H04W 72/0466 |
| 10,033,428 | B2 * | 7/2018 | Liu | H04B 1/525 |
| 10,103,788 | B2 * | 10/2018 | Liu | H04L 25/03006 |
| 10,110,265 | B2 * | 10/2018 | Sesia | H04J 11/005 |
| 10,355,899 | B2 * | 7/2019 | Wang | H04W 72/0413 |
| 10,383,105 | B2 * | 8/2019 | Byun | H04W 72/04 |
| 10,484,040 | B2 * | 11/2019 | Lim | H04B 1/525 |
| 10,491,260 | B2 * | 11/2019 | Kim | H04B 1/525 |
| 10,505,680 | B2 * | 12/2019 | Marinier | H04L 5/001 |
| 10,560,229 | B2 * | 2/2020 | Xiong | H04L 1/1861 |
| 10,567,147 | B2 * | 2/2020 | DiFazio | H04L 5/14 |
| 2013/0044621 | A1 | 2/2013 | Jung et al. | |
| 2013/0195041 | A1 | 8/2013 | Papasakellariou et al. | |
| 2013/0250869 | A1 | 9/2013 | Eriksson | |
| 2013/0273834 | A1 | 10/2013 | Sundstrom et al. | |
| 2013/0301593 | A1 | 11/2013 | Gaal et al. | |
| 2014/0066114 | A1 | 3/2014 | Kwon et al. | |
| 2015/0098401 | A1 * | 4/2015 | Park | H04W 72/042 370/329 |
| 2015/0109969 | A1 | 4/2015 | Celebi et al. | |
| 2015/0280887 | A1 | 10/2015 | Ko et al. | |
| 2016/0014727 | A1 | 1/2016 | Nimbalker | |
| 2016/0073391 | A1 | 3/2016 | Awad | |
| 2016/0127030 | A1 * | 5/2016 | Kim | H04B 7/0413 370/329 |
| 2016/0127936 | A1 * | 5/2016 | Chatterjee | H04B 7/0626 370/252 |
| 2016/0234003 | A1 * | 8/2016 | Wang | H04W 72/0446 |
| 2016/0234829 | A1 * | 8/2016 | Takahashi | H04L 5/0057 |
| 2016/0337108 | A1 * | 11/2016 | Choi | H04L 1/1825 |
| 2017/0302337 | A1 | 10/2017 | Liu et al. | |
| 2017/0339667 | A1 * | 11/2017 | Shen | H04W 72/0406 |
| 2018/0097607 | A1 | 4/2018 | Ji et al. | |
| 2018/0159643 | A1 * | 6/2018 | Huang | H04J 11/0036 |
| 2019/0190636 | A1 * | 6/2019 | Kim | H04L 27/2666 |
| 2019/0253224 | A1 | 8/2019 | Sun et al. | |
| 2019/0335471 | A1 * | 10/2019 | Kim | H04L 5/1461 |

FOREIGN PATENT DOCUMENTS

| | | |
|---|---|---|
| WO | 2015134907 | 9/2015 |
| WO | 2015147571 | 10/2015 |
| WO | 2015160333 | 10/2015 |
| WO | 2015178640 | 11/2015 |

OTHER PUBLICATIONS

Nokia, et al., "Non-anchor PRB location for NB-IoT multi-carver operation", 3GPP TSG RAN WG1 Meeting #85, R1-165002, May 2016, 2 pages.

Nokia, et al., "NB-IoT Operation in Multiple PRBs", 3GPP TSG RAN WG1 Meeting #84, R1-160447, Feb. 2016, 6 pages.

PCT International Application No. PCT/KR2016/008329, Written Opinion of the International Searching Authority dated Feb. 27, 2017, 8 pages.

U.S. Appl. No. 16/309,415, Office Action dated Jul. 2, 2020, 19 pages.

U.S. Appl. No. 16/309,415, Final Office Action dated Oct. 8, 2020, 22 pages.

\* cited by examiner

[Fig. 1]
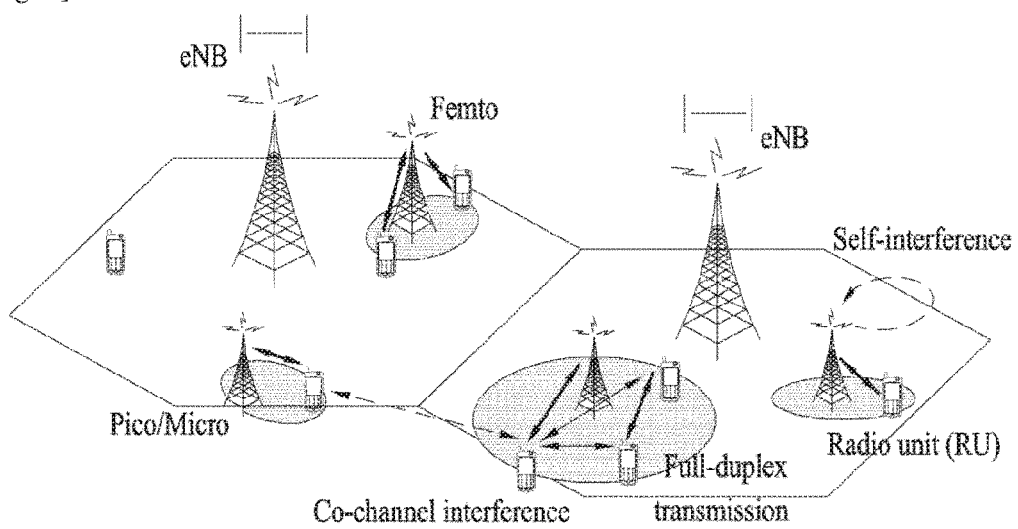

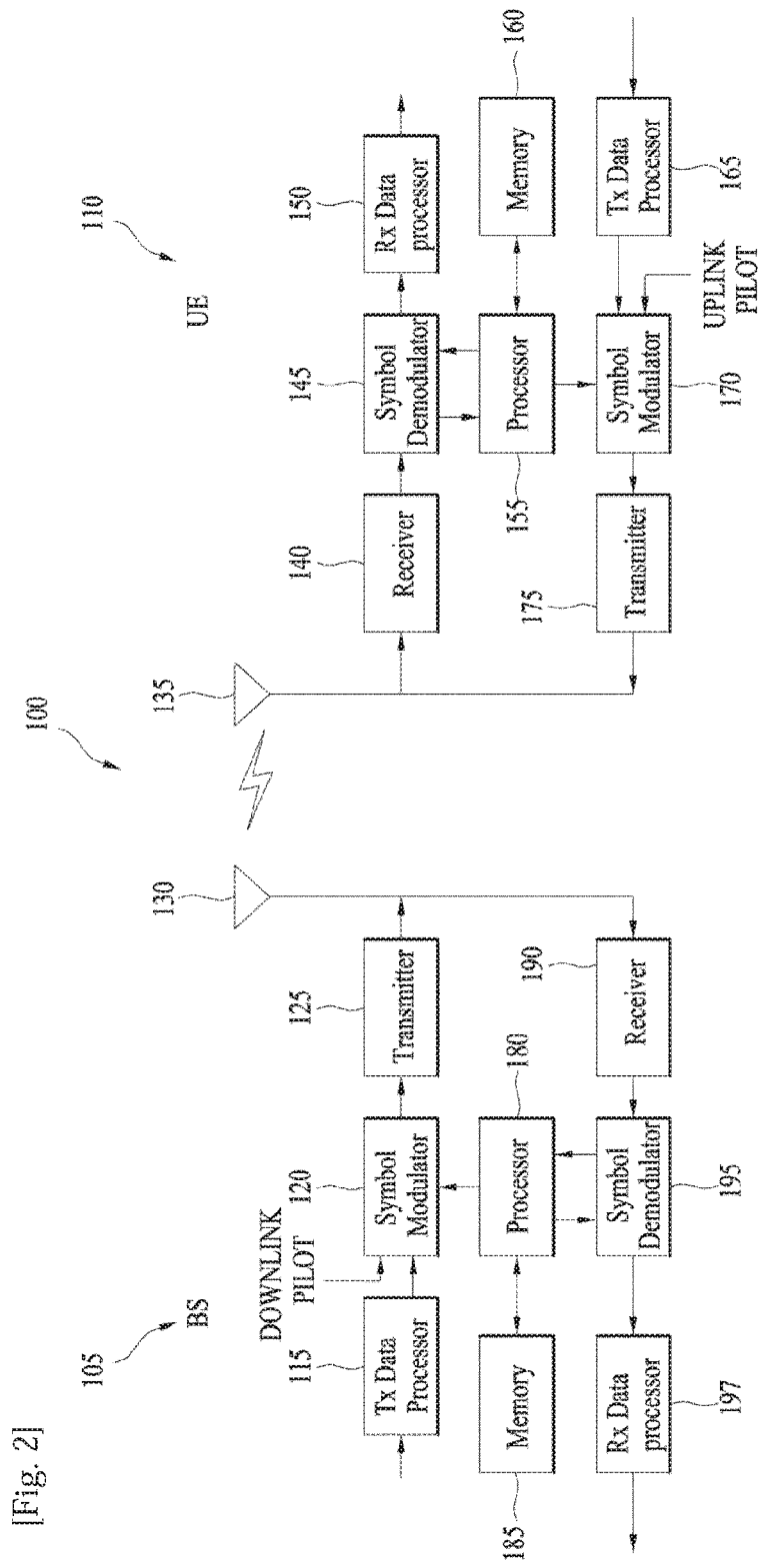
[Fig. 2]

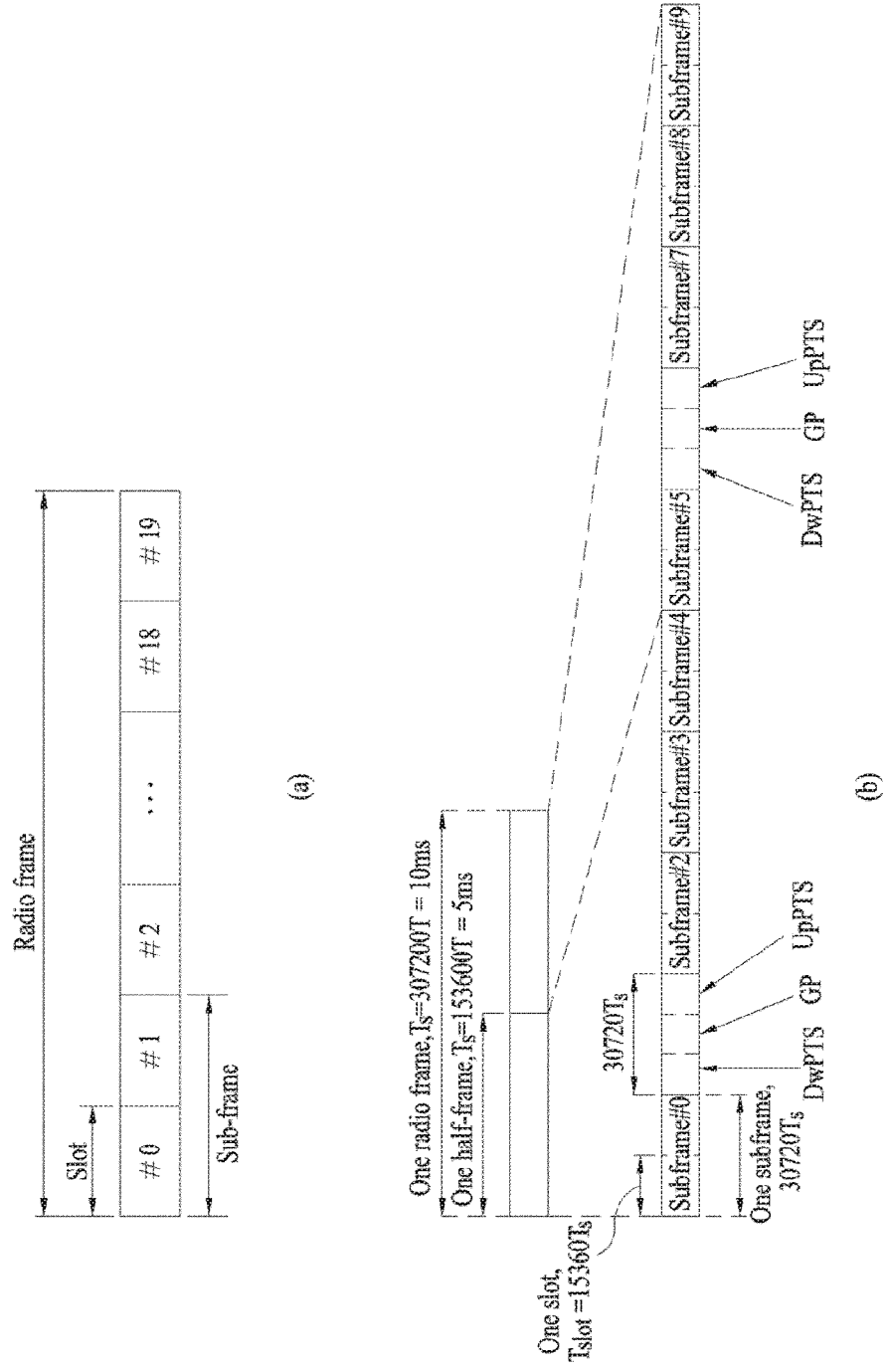

[Fig. 4]
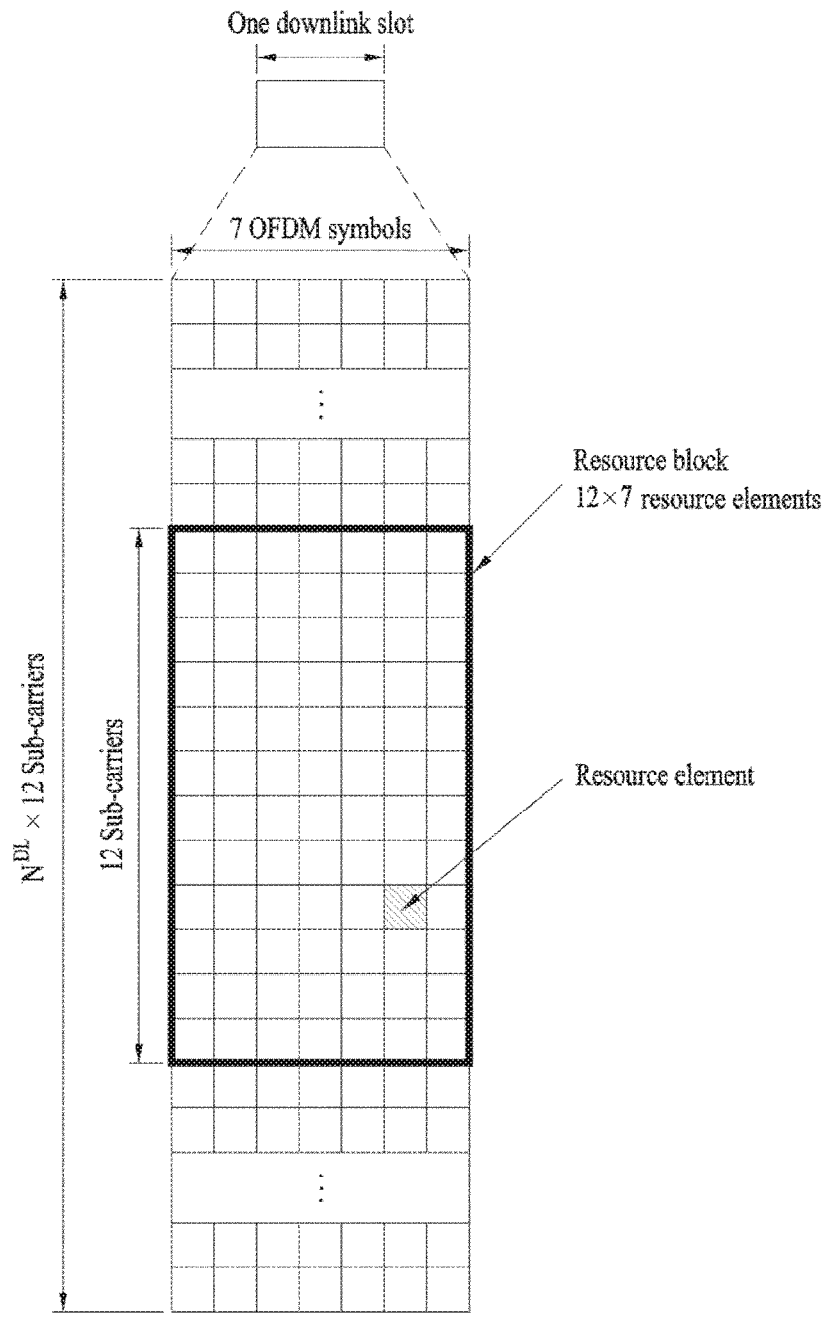

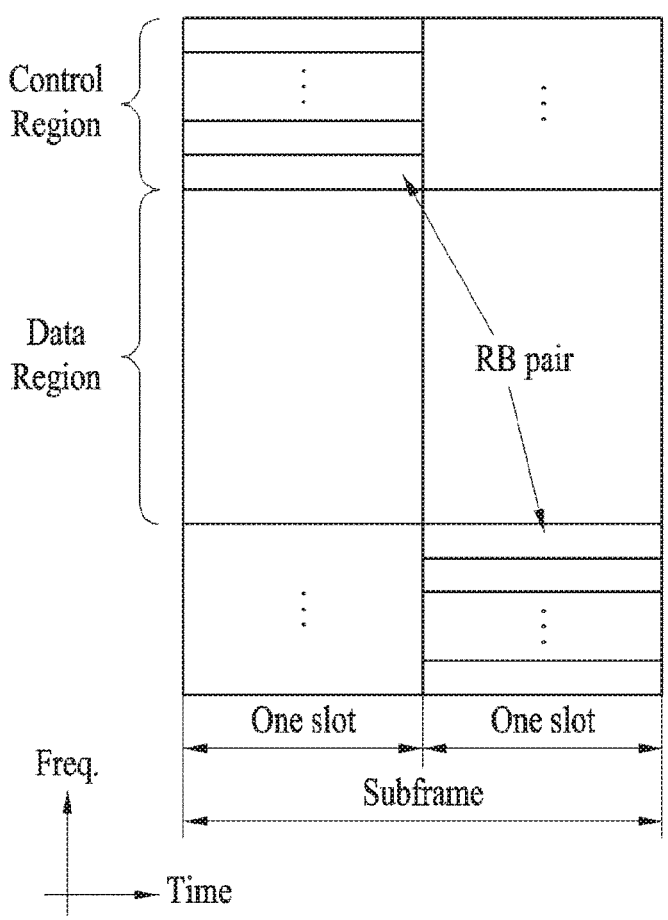
[Fig. 5]

[Fig. 6]
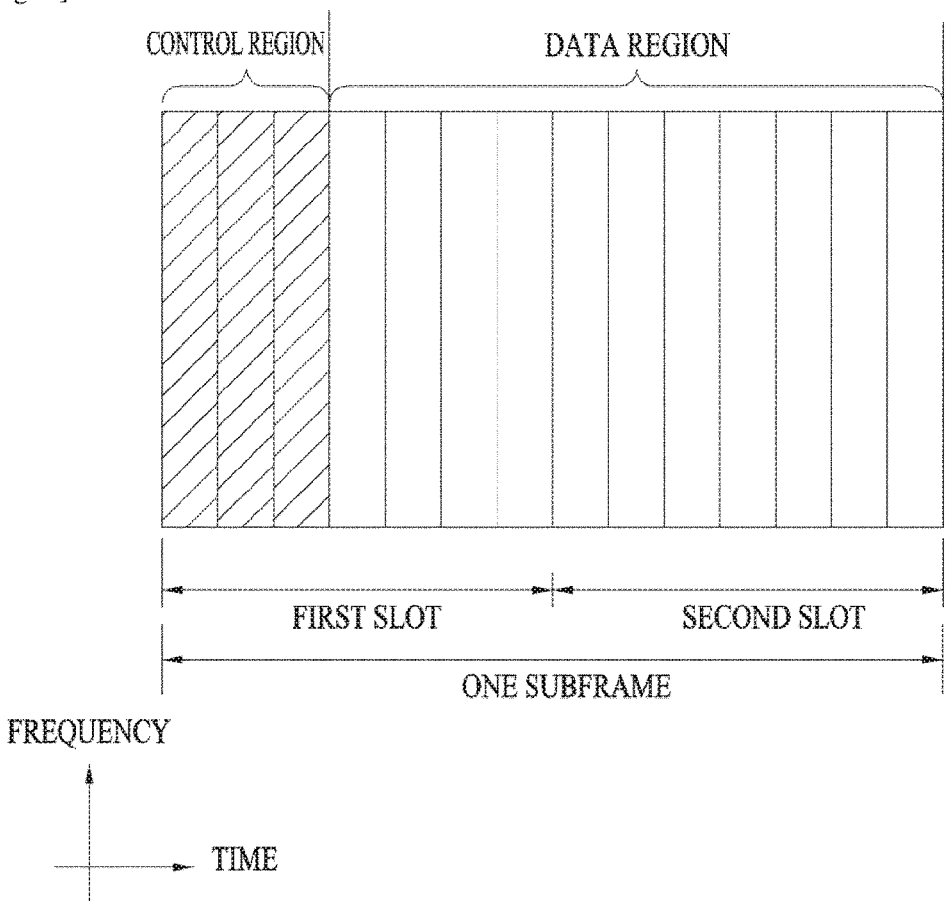
[Fig. 7]
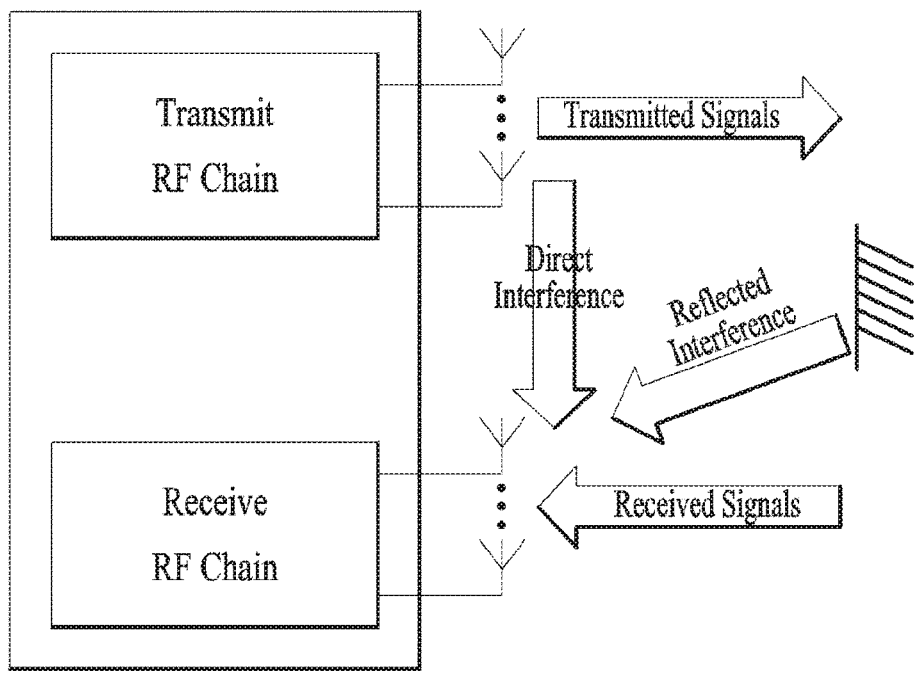

[Fig. 8]
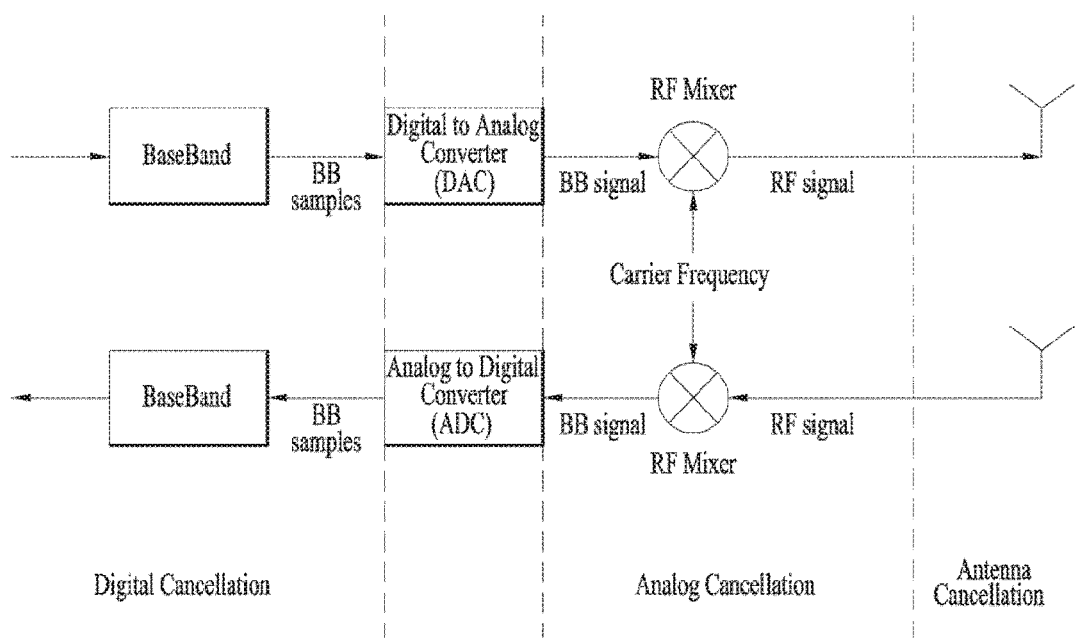

[Fig. 9]
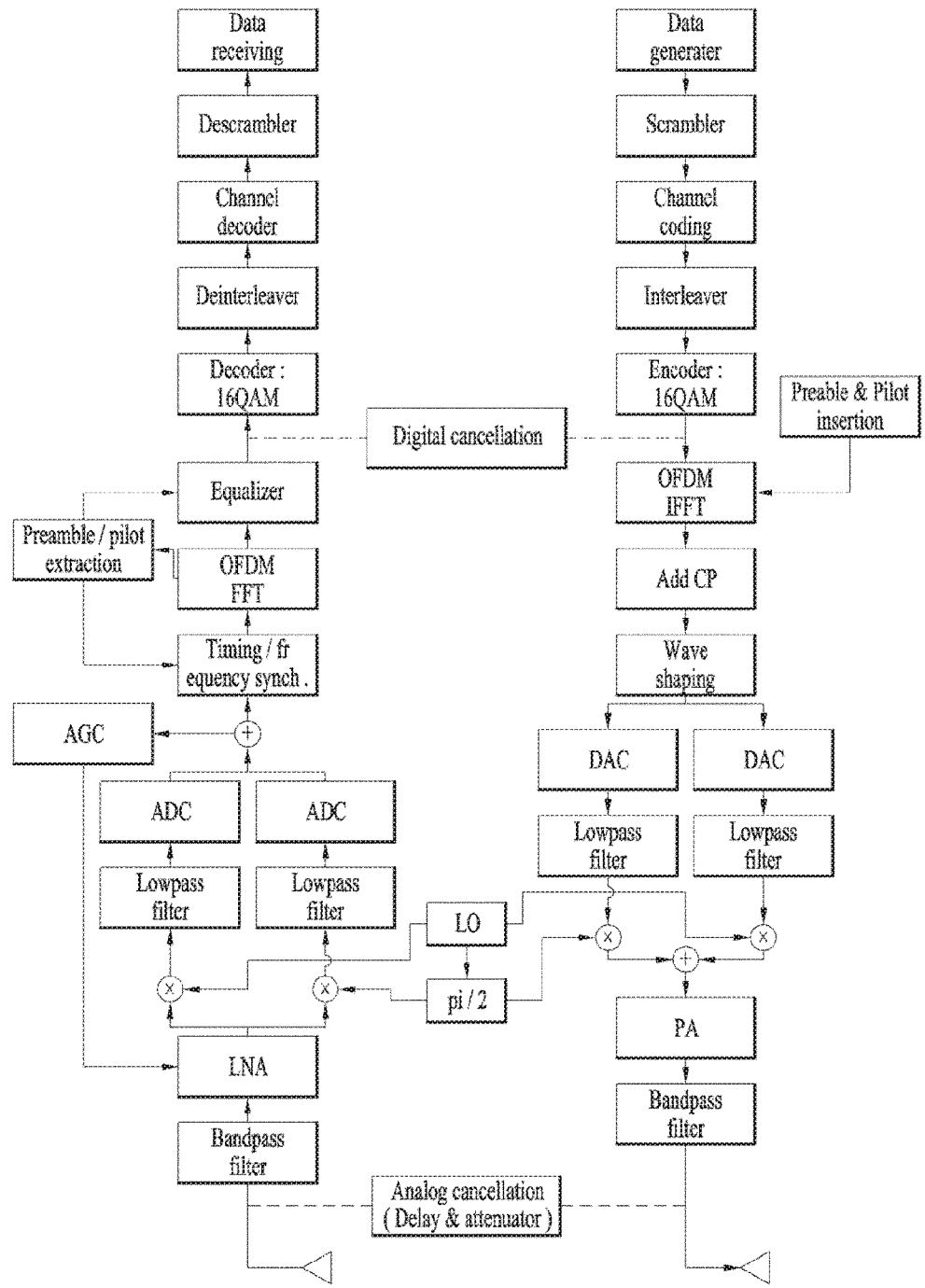

[Fig. 10]
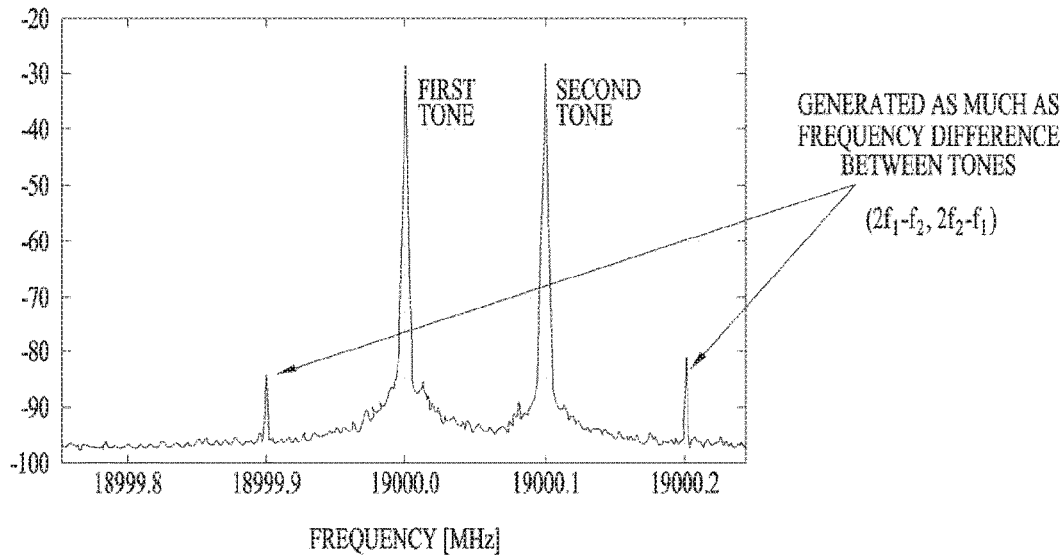
[Fig. 11]
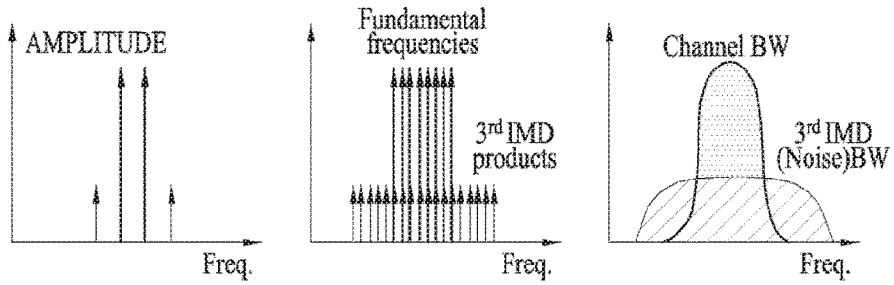
[Fig. 12]
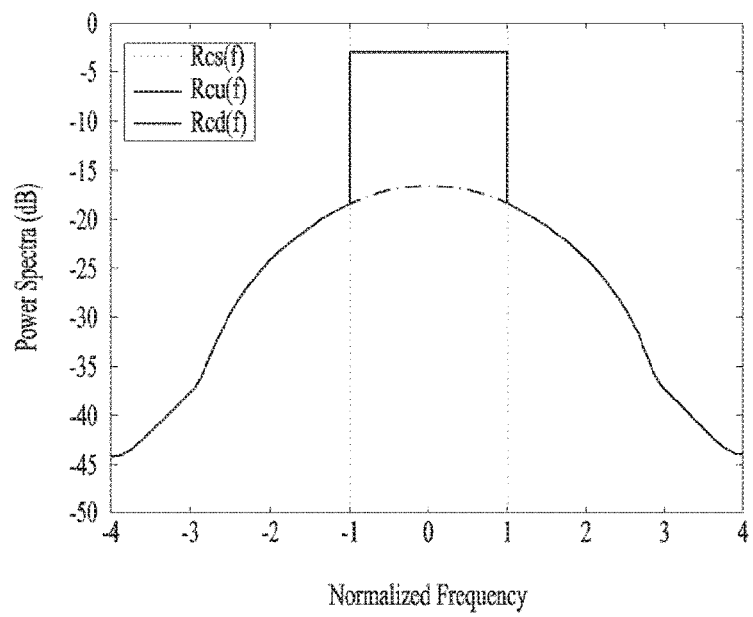

[Fig. 13]
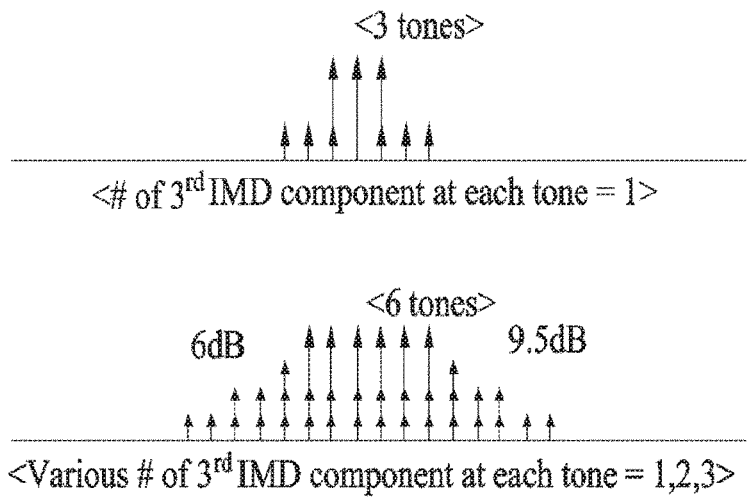
[Fig. 14]
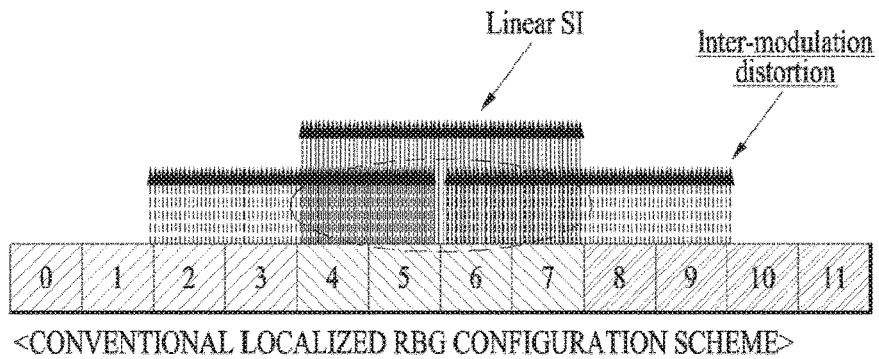
<CONVENTIONAL LOCALIZED RBG CONFIGURATION SCHEME>
$k = k_0+0, k_0+1, k_0+2, k_0+3, \ k_0=n_{PRB} \times N_{RB}^{DL}, \ 0 < n_{PRB} < N_{RB}^{DL}$
[Fig. 15]
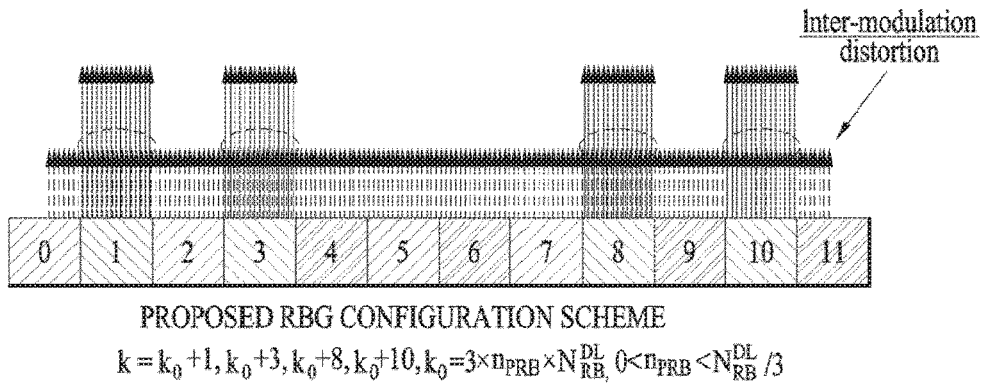
PROPOSED RBG CONFIGURATION SCHEME
$k = k_0+1, k_0+3, k_0+8, k_0+10, k_0=3 \times n_{PRB} \times N_{RB}^{DL}, \ 0 < n_{PRB} < N_{RB}^{DL}/3$
[Fig. 16a]
$k = k_0+\beta+0, k_0+\beta+2, k_0+\beta+8, k_0+\beta+10, \text{where } \beta=0,1,4,5, \ k_0= 4*n_{PRB}*N_{RB}^{DL} \ 0 < n_{PRB} < N_{RB}^{DL}/4$
| 0 | 1 | 2 | 3 | 4 | 5 | 6 | 7 | 8 | 9 | 10 | 11 | 12 | 13 | 14 | 15 |

[Fig. 16b]

| RBG index | PRB index | | | |
|---|---|---|---|---|
| 0 | 0 | 2 | 8 | 10 |
| 1 | 1 | 3 | 9 | 11 |
| 4 | 4 | 6 | 12 | 14 |
| 5 | 5 | 7 | 13 | 15 |
| ... | ... | ... | ... | ... |
| Mod($N_{RBG}$,4)=0 | $K_0$+0 | $K_0$+2 | $K_0$+5 | $K_0$+7 |
| β=0,1,4,5 | +β | +β | +β | +β |

[Fig. 17a]

$k = k_0+0, k_0+2, k_0+5, k_0+7$, $k = k_0+1, k_0+3, k_0+8, k_0+10$, $k = k_0+4, k_0+6, k_0+9, k_0+11$  $k_0 = 3* n_{PRB} * N_{RB}^{DL}, 0 < n_{PRB} < N_{RB}^{DL}/3$

| 0 | 1 | 2 | 3 | 4 | 5 | 6 | 7 | 8 | 9 | 10 | 11 |
|---|---|---|---|---|---|---|---|---|---|---|---|

[Fig. 17b]

| RBG index | PRB index | | | |
|---|---|---|---|---|
| 0 | 0 | 2 | 5 | 7 |
| 1 | 1 | 3 | 8 | 10 |
| 2 | 4 | 6 | 9 | 11 |
| 3 | 12 | 14 | 17 | 19 |
| ... | ... | ... | ... | ... |
| Mod($N_{RBG}$,3)=0 | $K_0$+0 | $K_0$+2 | $K_0$+5 | $K_0$+7 |
| Mod($N_{RBG}$,3)=1 | $K_0$+1 | $K_0$+3 | $K_0$+8 | $K_0$+10 |
| Mod($N_{RBG}$,3)=2 | $K_0$+4 | $K_0$+6 | $K_0$+9 | $K_0$+11 |

[Fig. 18a]

$k = k_0 + \alpha + \theta$, $k_0 + \alpha + \beta + 8$, $k_0 + \alpha + \beta + 35$, $k_0 + \alpha + \beta + 43$, where $\alpha = 0,1,2,3$, $\beta = 0,4,16,24$ $k_0 = 8 \ast n_{PRB} \ast N_{RB}^{DL}$, $0 \leq n_{PRB} < N_{RB}^{DL}$

| | | | | | | | | | | | | | | | | |
|---|---|---|---|---|---|---|---|---|---|---|---|---|---|---|---|---|
| a=0 | 0,1, 2,3 | 4,5, 6,7 | 8,9, 10,11 | 12,13, 14,15 | 16,17, 18,19 | 20,21, 22,23 | 24,25, 26,27 | 28,29, 30,31 | 32,33, 34,35 | 36,37, 38,39 | 40,41, 42,43 | 44,45, 46,47 | 48,49, 50,51 | 52,53, 54,55 | 56,57, 58,59 | 60,61, 62,63 |
| a=1 | 0,1, 2,3 | 4,5, 6,7 | 8,9, 10,11 | 12,13, 14,15 | 16,17, 18,19 | 20,21, 22,23 | 24,25, 26,27 | 28,29, 30,31 | 32,33, 34,35 | 36,37, 38,39 | 40,41, 42,43 | 44,45, 46,47 | 48,49, 50,51 | 52,53, 54,55 | 56,57, 58,59 | 60,61, 62,63 |
| a=2 | 0,1, 2,3 | 4,5, 6,7 | 8,9, 10,11 | 12,13, 14,15 | 16,17, 18,19 | 20,21, 22,23 | 24,25, 26,27 | 28,29, 30,31 | 32,33, 34,35 | 36,37, 38,39 | 40,41, 42,43 | 44,45, 46,47 | 48,49, 50,51 | 52,53, 54,55 | 56,57, 58,59 | 60,61, 62,63 |
| a=3 | 0,1, 2,3 | 4,5, 6,7 | 8,9, 10,11 | 12,13, 14,15 | 16,17, 18,19 | 20,21, 22,23 | 24,25, 26,27 | 28,29, 30,31 | 32,33, 34,35 | 36,37, 38,39 | 40,41, 42,43 | 44,45, 46,47 | 48,49, 50,51 | 52,53, 54,55 | 56,57, 58,59 | 60,61, 62,63 |

[Fig. 18b]

| RBG index | PRB index | | | |
|---|---|---|---|---|
| 0 | 0 | 8 | 35 | 43 |
| 1 | 1 | 9 | 34 | 42 |
| 2 | 2 | 10 | 33 | 41 |
| 3 | 3 | 11 | 32 | 40 |
| ... | ... | ... | ... | ... |
| $Mod(N_{RBG}, 16)=0$ | $K_0+0$ | $K_0+8$ | $K_0+35$ | $K_0+43$ |
| $a=1,2,4,3, \beta=0,1,4,5$ | $+a+\beta$ | $+a+\beta$ | $-a+\beta$ | $-a+\beta$ |

[Fig. 19a]

$k = k_0+a+0, k_0+a+8, k_0+a+23, k_0+a+31, \quad k = k_0+a+4, k_0+a+12, k_0+a+32, k_0+a+40, \quad k = k_0+a+16, k_0+a+24, k_0+a+39, k_0+a+47$
where $a=0,1,2,3$, $k_0 = 6 \cdot n_{PRB} \cdot N_{sc}^{R} N_{RB}^{DL}$, $n_{PRB} < N_{sc}^{R} N_{RB}^{DL}$

| | 0,1,2,3 | 4,5,6,7 | 8,9,10,11 | 12,13,14,15 | 16,17,18,19 | 20,21,22,23 | 24,25,26,27 | 28,29,30,31 | 32,33,34,35 | 36,37,38,39 | 40,41,42,43 | 44,45,46,47 |
|---|---|---|---|---|---|---|---|---|---|---|---|---|
| a=0 | 0,1,2,3 | 4,5,6,7 | 8,9,10,11 | 12,13,14,15 | 16,17,18,19 | 20,21,22,23 | 24,25,26,27 | 28,29,30,31 | 32,33,34,35 | 36,37,38,39 | 40,41,42,43 | 44,45,46,47 |
| a=1 | 0,1,2,3 | 4,5,6,7 | 8,9,10,11 | 12,13,14,15 | 16,17,18,19 | 20,21,22,23 | 24,25,26,27 | 28,29,30,31 | 32,33,34,35 | 36,37,38,39 | 40,41,42,43 | 44,45,46,47 |
| a=2 | 0,1,2,3 | 4,5,6,7 | 8,9,10,11 | 12,13,14,15 | 16,17,18,19 | 20,21,22,23 | 24,25,26,27 | 28,29,30,31 | 32,33,34,35 | 36,37,38,39 | 40,41,42,43 | 44,45,46,47 |
| a=3 | 0,1,2,3 | 4,5,6,7 | 8,9,10,11 | 12,13,14,15 | 16,17,18,19 | 20,21,22,23 | 24,25,26,27 | 28,29,30,31 | 32,33,34,35 | 36,37,38,39 | 40,41,42,43 | 44,45,46,47 |

[Fig. 19b]
| RBG index | PRB index | | | |
|---|---|---|---|---|
| 0 | 0 | 8 | 23 | 31 |
| 1 | 1 | 9 | 22 | 30 |
| 2 | 2 | 10 | 21 | 29 |
| 3 | 3 | 11 | 20 | 28 |
| ... | ... | ... | ... | ... |
| $Mod(N_{RBG},12)=0$ | $K_0+0$ | $K_0+8$ | $K_0+23$ | $K_0+31$ |
| a=1,2,3 | +a | +a | -a | -a |
| $Mod(N_{RBG},12)=5$ | $K_0+4$ | $K_0+12$ | $K_0+32$ | $K_0+40$ |
| a=1,2,3 | +a | +a | -a | -a |
| $Mod(N_{RBG},12)=9$ | $K_0+16$ | $K_0+24$ | $K_0+39$ | $K_0+47$ |
| a=1,2,3 | +a | +a | -a | -a |
[Fig. 20a]
$k = k_0+0, k_0+2, k = k_0+1, k_0+3, k = 2*n_{PRB}*N_{RB}^{DL}, 0<n_{PRB}<N_{RB}^{DL}/2$
[Fig. 20b]
| RBG index | PRB index | |
|---|---|---|
| 0 | 0 | 2 |
| 1 | 1 | 3 |
| 2 | 4 | 6 |
| 3 | 5 | 7 |
| ... | ... | ... |
| $Mod(N_{RBG},2)=0$ | $K_0+0$ | $K_0+2$ |
| $Mod(N_{RBG},2)=1$ | $K_0+1$ | $K_0+3$ |
[Fig. 21a]
$k = k_0+0, k_0+2, k = k_0+5, k_0 = k_0+1, k_0+3, k_0+7, k_0 = k_0+4, k_0+8, k_0+10, k = k_0+6, k_0+9, k_0+11, k_0 = 4*n_{PRB}*N_{RB}^{DL}, 0<n_{PRB}<N_{RB}^{DL}/4$
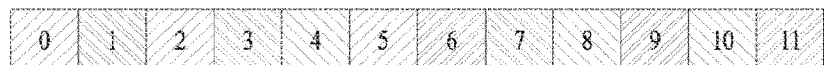

[Fig. 21b]

| RBG index | PRB index | | |
|---|---|---|---|
| 0 | 0 | 2 | 5 |
| 1 | 1 | 3 | 7 |
| 2 | 4 | 8 | 10 |
| 3 | 6 | 9 | 11 |
| ... | ... | ... | ... |
| $Mod(N_{RBG},3)=0$ | $K_0+0$ | $K_0+2$ | $K_0+5$ |
| $Mod(N_{RBG},3)=1$ | $K_0+1$ | $K_0+3$ | $K_0+7$ |
| $Mod(N_{RBG},3)=2$ | $K_0+4$ | $K_0+8$ | $K_0+10$ |
| $Mod(N_{RBG},3)=2$ | $K_0+6$ | $K_0+9$ | $K_0+11$ |

[Fig. 22a]

$k = k_0+\beta+0, k_0+\beta+1, k_0+\beta+4, k_0+\beta+5, k_0+\beta+14, k_0+\beta+15, k = k_0+\beta+2, k_0+\beta+3, k_0+\beta+12, k_0+\beta+13, k_0+\beta+16, k_0+\beta+17$,
where $\beta=0,6$, $k_0=6*n_{PRB}*N_{SC}^{RB}$, $0<n_{PRB}<N_{SC}^{RB}/6$

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

[Fig. 22b]

| RBG index | PRB index | | | | | |
|---|---|---|---|---|---|---|
| 0 | 0 | 1 | 4 | 5 | 14 | 15 |
| 1 | 2 | 3 | 12 | 13 | 16 | 17 |
| 2 | 6 | 7 | 10 | 11 | 20 | 21 |
| 3 | 8 | 9 | 18 | 19 | 22 | 23 |
| ... | ... | ... | ... | | | ... |
| $Mod(N_{RBG},6)=0$ | $K_0+0$ | $K_0+1$ | $K_0+4$ | $K_0+5$ | $K_0+14$ | $K_0+15$ |
| $Mod(N_{RBG},6)=2$ | $K_0+2$ | $K_0+3$ | $K_0+12$ | $K_0+13$ | $K_0+16$ | $K_0+17$ |
| $\beta=0,6$ | $+\beta$ | $+\beta$ | $+\beta$ | $+\beta$ | $+\beta$ | $+\beta$ |

[Fig. 23]

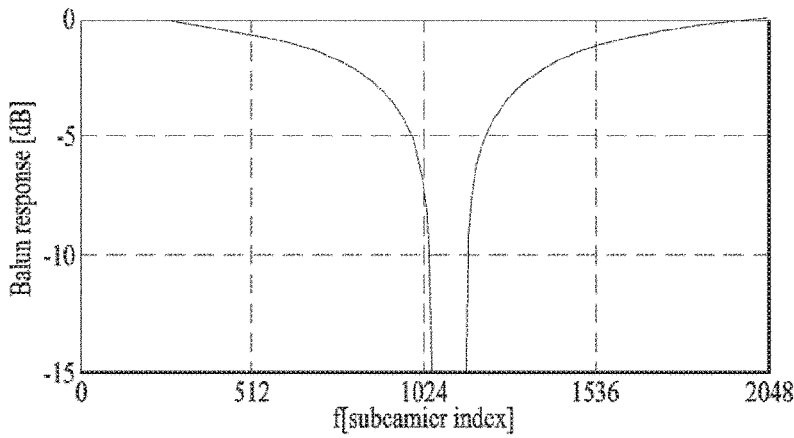

Figure 5.5. Balun frequency response.

[Fig. 24]
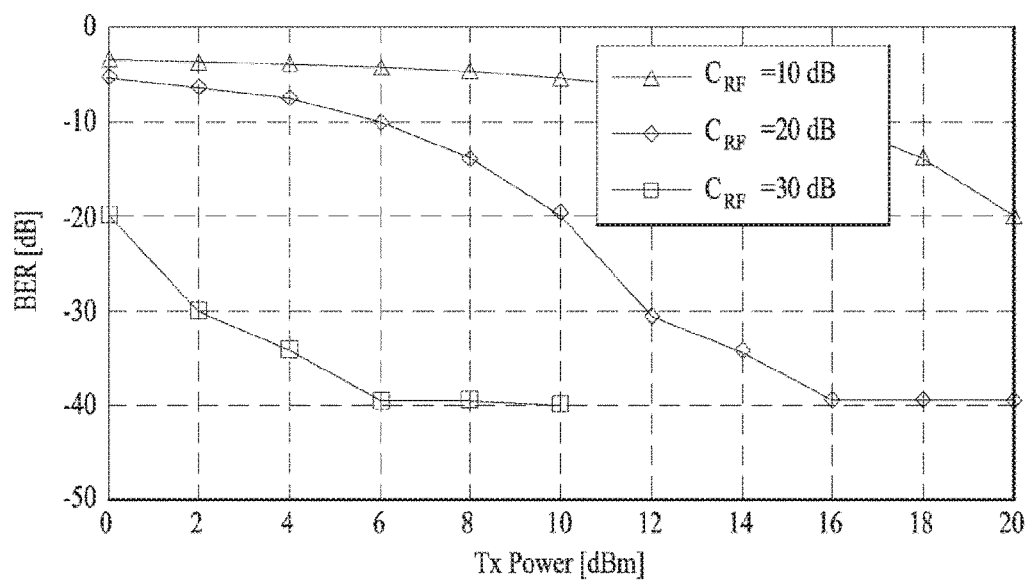

[Fig. 25]
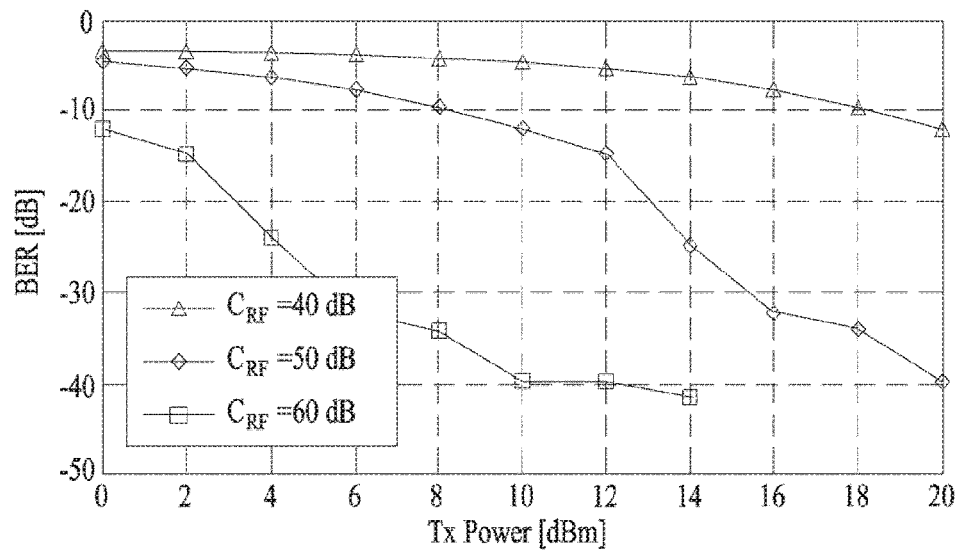
(a) 5dB isolation degradation
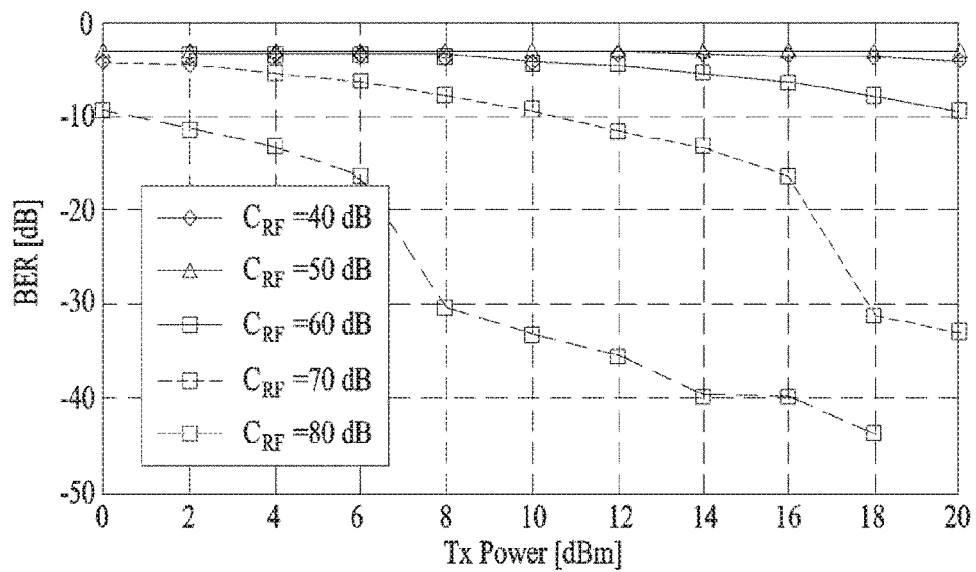
(b) 155dB isolation degradation

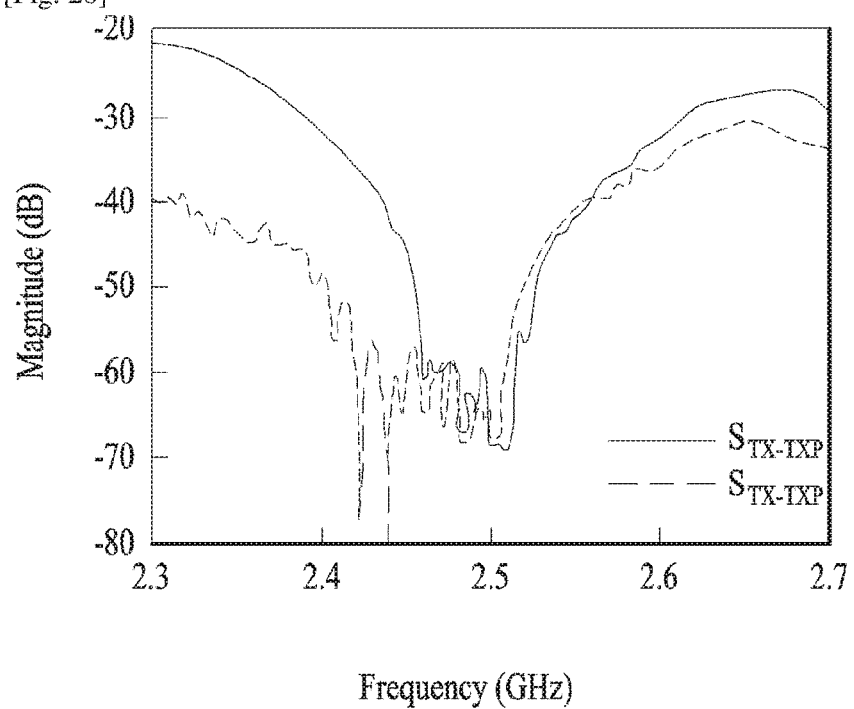
[Fig. 26]

[Fig. 27]
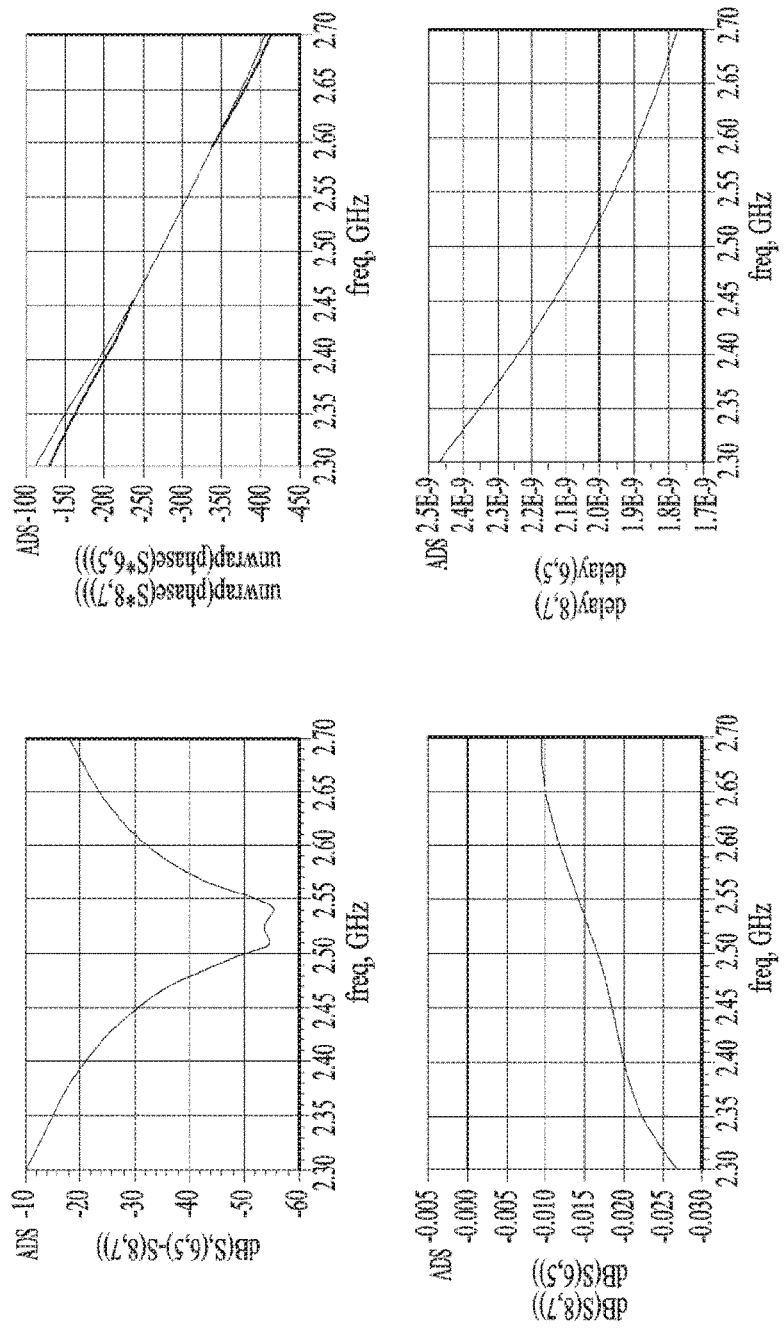

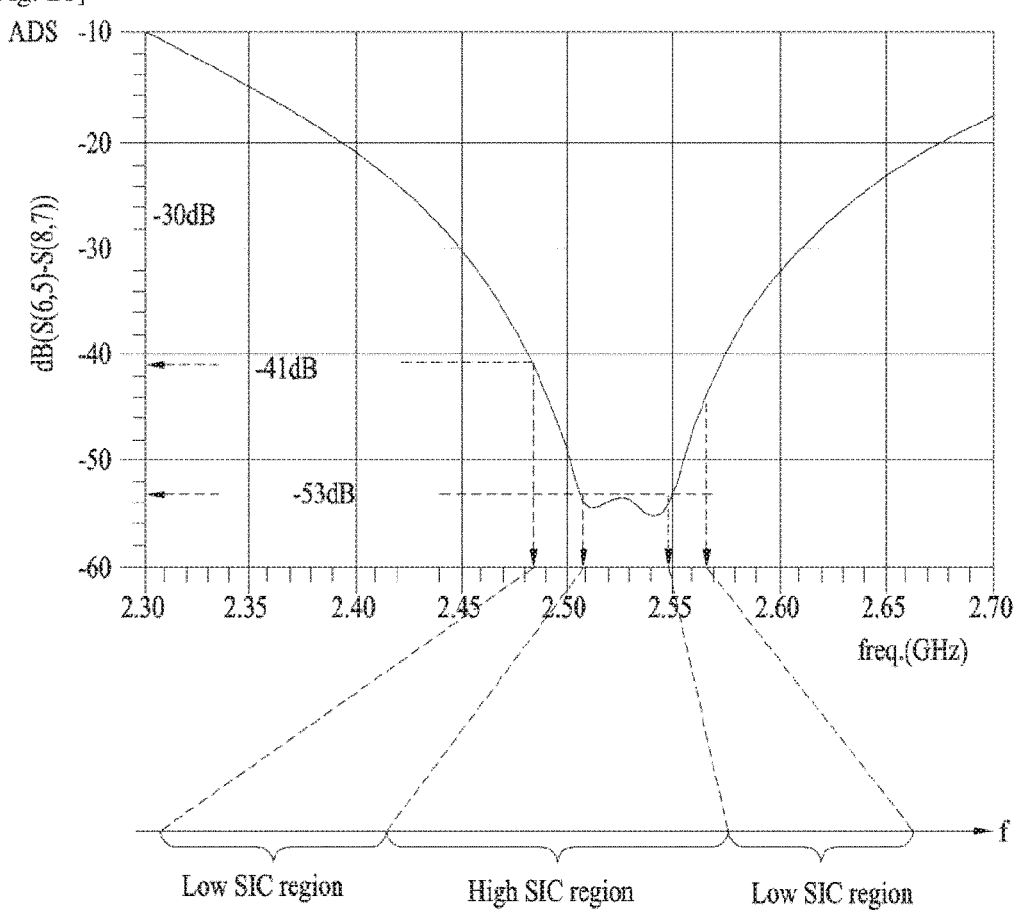
[Fig. 28]

METHOD AND APPARATUS FOR ALLOCATING RESOURCES TO FDR-MODE UE IN A WIRELESS COMMUNICATION SYSTEM

CROSS-REFERENCE TO RELATED APPLICATIONS

This application is the National Phase of PCT International Application No. PCT/KR2017/000732, filed on Jan. 20, 2017, which claims the benefit of U.S. Provisional Application No. 62/348,957, filed on Jun. 12, 2016, the contents of which are all hereby incorporated by reference herein their entirety.

TECHNICAL FIELD

The present invention relates to wireless communication, and more particularly, to a method and apparatus for receiving resource allocation information in a wireless communication system.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

DISCLOSURE OF INVENTION

Technical Problem

An object of the present invention devised to solve the problem lies on a method for receiving resource allocation information by a User Equipment (UE) in a wireless communication system.

Another object of the present invention devised to solve the problem lies on a UE for receiving resource allocation information in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

The object of the present invention can be achieved by providing a method for receiving resource allocation information by a user equipment in a wireless communication system. The method includes receiving, from a base station (BS), control in-formation including downlink resource allocation information and an indicator indicating downlink resource allocation for the user equipment operating in Full Duplex Radio (FDR) mode. The downlink resource allocation information indicates at least one first Resource Block Group (RBG) index, each of the at least one RBG index corresponding to a plurality of non-contiguous Physical Resource Block (PRB) indexes in a frequency domain. The method further includes receiving, from the base station, downlink data based on the downlink resource allocation information and based on the indicator.

The downlink data may be received based on the downlink resource allocation information and the PRB indexes corresponding to the at least one RBG index.

If the number of the at least one RBG index is 1, PRBs having PRB indexes corresponding to an RBG index may be positioned in a frequency region having a self-interference cancellation performance higher than a threshold or all frequency regions in a system bandwidth. The frequency region having the self-interference cancellation performance higher than the threshold in the system bandwidth may be within a predetermined range from a center frequency.

When the number of the at least one RBG index is 2, PRBs having PRB indexes corresponding to one RBG index may be positioned in a frequency region having a self-interference cancellation performance higher than a threshold in a system bandwidth, and PRBs having PRB indexes corresponding to the other RBG index may be positioned in a frequency region having a self-interference cancellation performance lower than the threshold in the system bandwidth.

When the number of the at least one RBG index is 2, positions of PRBs corresponding to PRB indexes corresponding to the two RBG indexes may be determined according to a distributed resource allocation rule.

The control information may further include information indicating whether Reference Signal (RS) mapping for self-interference cancellation performance in the FDR mode is supported.

The control information may further include an indicator indicating uplink resource allocation for the UE operating in the FDR mode and uplink resource allocation information, and the uplink resource allocation information indicates at least one second RBG index, and the method may further include transmitting an uplink signal based on PRB indexes corresponding to the at least one second RBG index.

According to another aspect of the present invention, herein is provided a user equipment for receiving resource allocation information in a wireless communication system. The user equipment includes a receiver, and a processor. The processor is configured to control the receiver to receive, from a base station, control information including downlink resource allocation information and an indicator indicating downlink resource allocation for the UE operating in FDR mode. The downlink resource allocation information indicates at least one first RBG index, each of the at least one RBG index corresponding to a plurality of non-contiguous PRB indexes in a frequency domain. The processor is configured to control the receiver to receive downlink data based on the downlink resource allocation information and based on the indicator.

The processor may be further configured to control the receiver to receive the downlink data based on the downlink resource allocation information and the PRB indexes corresponding to the at least one RBG index.

If the number of the at least one RBG index is 1, PRBs having PRB indexes corresponding to the one RBG index may be positioned in a frequency region having a self-interference cancellation performance higher than a threshold or all frequency regions in a system bandwidth. The frequency region having the self-interference cancellation performance higher than the threshold in the system bandwidth may be within a predetermined range from a center frequency.

When the number of the at least one RBG index is 2, PRBs having PRB indexes corresponding to an RBG index may be positioned in a frequency region having a self-interference cancellation performance higher than a threshold in a system bandwidth, and PRBs having PRB indexes corresponding to the other RBG index may be positioned in a frequency region having a self-interference cancellation performance lower than the threshold in the system bandwidth.

When the number of the at least one RBG index is 2, positions of PRBs corresponding to PRB indexes corresponding to the two RBG indexes may be determined according to a distributed resource allocation rule.

The user equipment may further include a transmitter, the control information may further include an indicator indicating uplink resource allocation for the UE operating in the FDR mode and uplink resource allocation information, the uplink resource al-location information may indicate at least one second RBG index, and the processor may configured to control the transmitter to transmit an uplink signal based on PRB indexes corresponding to the at least one second RBG index.

The control information may further include information indicating whether RS mapping for self-interference cancellation performance in the FDR mode is supported.

Advantageous Effects of Invention

According to an embodiment of the present invention, communication performance can be increased by allocating resources in such a manner than non-linear components produced by the non-linearity of a transmitter may be reduced remarkably in a self-interference signal inherent to Full Duplex Radio (FDR) mode characterized by simultaneous transmission and reception in the same frequency band.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a view illustrating an exemplary network supporting half-duplex/full-duplex communication of a User Equipment (UE), proposed by the present invention;

FIG. 2 is a block diagram of a Base Station (BS) and a UE in a wireless communication system;

FIG. 3 is a view illustrating exemplary radio frame structures in a 3rd Generation Partnership Project (3GPP) Long Term Evolution (LTE)/LTE-Advanced (LTE-A) system as an exemplary wireless communication system;

FIG. 4 is a view illustrating an exemplary resource grid for the duration of one Downlink (DL) slot in the 3GPP LTE/LTE-A system as an exemplary wireless communication system;

FIG. 5 is a view illustrating an exemplary Uplink (UL) subframe structure in the 3GPP LTE/LTE-A system as an exemplary wireless communication system;

FIG. 6 is a view illustrating an exemplary Downlink (DL) subframe structure in the 3GPP LTE/LTE-A system as an exemplary wireless communication system;

FIG. 7 is a conceptual view of transmission and reception links and Self-Interference (SI) in a Full Duplex Radio (FDR) communication situation;

FIG. 8 is a view illustrating positions at which three interference cancellation schemes are applied, in a Radio Frequency (RF) transmission and reception end (or an RF front end) of a device;

FIG. 9 is a block diagram of a Self-Interference Cancellation (Self-IC) device in a proposed communication apparatus in an Orthogonal Frequency Division Multiplexing (OFDM) communication system environment based on FIG. 8;

FIG. 10 is a view illustrating exemplary 3rd Inter-Modulation Distortion (IMD) components generated in adjacent frequency bands during two-tone transmission;

FIG. 11 is a view illustrating 3rd IMD components generated during multi-tone transmission;

FIG. 12 is a graph illustrating power spectral densities (dB) including IMD components in an OFDM system;

FIG. 13 is a view comparing the power amounts of IMD components at respective tones according to transmission BandWidths (BWs);

FIG. 14 is a view illustrating linear and non-linear SI components at each tone in a conventional Resource Block Group (RBG) configuration rule;

FIG. 15 is a view illustrating linear and non-linear SI components at each tone, when RBGs are configured non-uniformly;

FIG. 16A is a view illustrating an exemplary method for configuring RBGs by grouping 16 contiguous Physical Resource Blocks (PRBs) for RBG=4 according to a first proposal (Proposal 1) of the present invention;

FIG. 16B illustrates an exemplary PRB mapping table laid out according to FIG. 16A;

FIG. 17A is a view illustrating an exemplary method for configuring RBGs by grouping 12 contiguous PRBs for RBG=4 according to Proposal 1 of the present invention;

FIG. 17B illustrates an exemplary PRB mapping table laid out according to FIG. 17A;

FIG. 18A is a view illustrating an exemplary method for configuring RBGs by grouping 64 contiguous PRBs for RBG=4 according to Proposal 1 of the present invention;

FIG. 18B illustrates an exemplary PRB mapping table laid out according to FIG. 18A;

FIG. 19A is a view illustrating an exemplary method for configuring RBGs by grouping 48 contiguous PRBs for RBG=4 according to Proposal 1 of the present invention;

FIG. 19B illustrates an exemplary PRB mapping table laid out according to FIG. 19A;

FIG. 20A is a view illustrating an exemplary PRB mapping of two PRBs selected from among four PRBs for RBG=2 in Embodiment 1-1, Embodiment 1-2, Embodiment 1-3, and Embodiment 1-4 according to a second proposal (Proposal 2) of the present invention;

FIG. 20B illustrates an exemplary PRB mapping table laid out according to FIG. 20A;

FIG. 21A is a view illustrating an exemplary method for configuring RBGs by grouping 12 contiguous PRBs for RBG=3 according to Proposal 2 of the present invention;

FIG. 21B illustrates an exemplary PRB mapping table laid out according to FIG. 21A;

FIG. 22A is a view illustrating an exemplary method for configuring RBGs by grouping 24 contiguous PRBs for RBG=6 according to a third proposal (Proposal 3) of the present invention; and FIG. 22B illustrates an exemplary PRB mapping table laid out according to FIG. 22A.

FIG. 23 is a graph illustrating balun frequency responses;

FIG. 24 is a graph illustrating Bit Error Rate (BER) performance, when digital Self-IC is performed after analog Self-IC using a balun having ideal performance;

FIG. 25 is a graph illustrating BER performance, when digital Self-IC is performed after analog Self-IC using baluns having 5 dB isolation degradation and 15 dB isolation degradation;

FIG. 26 is a graph illustrating Self-IC levels after 1-Tx and 2-Rx antenna Self-IC and analog Self-IC are performed using a rat race coupler;

FIG. 27 is a graph illustrating Self-IC levels after 2-Tx and 2-Rx antenna Self-IC and analog Self-IC are performed using a rat race coupler; and FIG. 28 is a graph illustrating regions divided based on average antenna/analog Self-IC performances in a 2×2 Multiple Input Multiple Output (MIMO) FDR mode with a 80-MHz BW from a center frequency of 2.52 GHz.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control in-formation. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS). 3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present invention. And, the use of the specific terminology can be modified into another form within the scope of the technical idea of the present invention.

FIG. 2 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 2, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a micro-processor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

FIG. 3 is a view illustrating exemplary radio frame structures in a 3GPP LTE/LTE-A system as an exemplary wireless communication system.

In general, regarding wireless transmission between a BS and a UE which are wireless devices, transmission from the BS to the UE is generically called DL transmission, and transmission from the UE to the BS is generically called UL transmission. A scheme of distinguishing radio resources between DL transmission and UL transmission is defined as duplex. If a frequency band is divided into a DL transmission band and a UL transmission band, and bidirectional transmission and reception are performed in the DL and UL transmission bands, this is referred to as Frequency Division Duplex (FDD). On the other hand, if time-domain radio resources in the same frequency band are divided into a DL period and a UL period and transmission and reception are performed in the DL and UL periods, this is referred to as Time Division Duplex (TDD).

In a cellular OFDM wireless packet communication system, UL/DL data packets are transmitted in subframes, and one subframe is defined as a predetermined time period including a plurality of OFDM symbols. The 3GPP LTE standards support a type-1 radio frame structure applicable to FDD and a type-2 radio frame structure applicable to TDD.

FIG. 3(a) illustrates the structure of the type 1 radio frame. A DL radio frame includes 10 subframes, each subframe including two slots in the time domain. A time taken to transmit one subframe is defined as a Transmission Time Interval (TTI). For example, one subframe may be 1 ms long, and one slot may be 0.5 ms long. One slot includes a plurality of OFDM symbols in time by a plurality of Resource Blocks (RBs) in frequency. Since the 3GPP LTE system adopts OFDMA for DL, an OFDM symbol is one symbol period. An OFDM symbol may also be referred to as an SC-FDMA symbol or symbol period. An RB being a resource allocation unit may include a plurality of contiguous subcarriers in one slot.

The number of OFDM symbols in one slot may be different according to a Cyclic Prefix (CP) configuration. There are two types of CPs, normal CP and extended CP. For example, if an OFDM symbol is configured to include a normal CP, one slot may include seven OFDM symbols. On the other hand, if an OFDM symbol is configured to include an extended CP, the length of one OFDM symbol is increased and thus one slot includes fewer OFDM symbols than in the case of the normal CP. In the case of the extended CP, for example, one slot may include six OFDM symbols. If a channel state is unstable as is the case with a fast-moving UE, the extended CP may be used to further reduce inter-symbol interference.

In the case of the normal CP, one slot includes seven OFDM symbols, and thus one subframe includes 14 OFDM symbols. Up to three first OFDM symbols of each subframe may be allocated to a Physical Downlink Control Channel (PDCCH), and the other OFDM symbols of the subframe may be allocated to a Physical Downlink Shared Channel (PDSCH).

FIG. 3(b) illustrates the structure of the type 2 radio frame.

A type 2 radio frame includes two half frames, each half frame including five subframes, a Downlink Pilot Time Slot (DwPTS), a Guard Period (GP), and an Uplink Pilot Time Slot (UpPTS). A subframe includes two slots. The DwPTS is used for initial cell search, synchronization, or channel estimation at a UE. The UpPTS is used for an eNB to perform channel estimation and acquire UL synchronization with a UE. The GP is used to cancel UL interference between a UL and a DL, caused by the multi-path delay of a DL signal.

Each half frame includes five subframes, D represents a DL subframe, U represents a UL subframe, and S represents a special subframe including a DwPTS, a GP, and a UpPTS. The DwPTS is used for initial cell search, synchronization, or channel estimation at a UE. The UpPTS is used for an eNB to perform channel estimation and acquire UL synchronization with a UE. The GP is used to cancel UL interference between a UL and a DL, caused by the multi-path delay of a DL signal.

In the case of a 5-ms DL-UL switch point periodicity, a special subframe S exists in every half frame. Subframe 0 and subframe 5, and DwPTSs are used for DL transmission only. A UpPTS and a subframe shortly following a special subframe are used for UL transmission only. If multiple cells are aggregated, a UE may assume the same UL-DL configuration across all cells, and the GP of a special subframe may overlap over at least 1456 Ts between different cells. The radio frame structures are purely exemplary, and thus the number of subframes in a radio frame, the number of slots in a subframe, and the number of symbols in a slot may be changed in various manners.

FIG. 4 illustrates a resource grid for the duration of one DL slot in the 3GPP LTE/LTE-A system as an exemplary wireless communication system.

Referring to FIG. 4, a DL slot includes a plurality of OFDM symbols in the time domain. One DL slot includes 7 (or 6) OFDM symbols in the time domain by a plurality of Resource Blocks (RBs) in the frequency domain. Each RB includes 12 sub-carriers. Each element of a resource grid is called a Resource Element (RE). One RB includes 12×7(6) REs. The number of RBs in a DL slot, NRB depends on a DL transmission band. The structure of a UL slot is identical to that of a DL slot, except that OFDM symbols are replaced with SC-FDMA symbols.

FIG. 5 is a view illustrating an exemplary UL subframe structure in the 3GPP LTE/LTE-A system as an exemplary wireless communication system.

Referring to FIG. 5, up to three (or four) OFDM symbols at the start of the first slot of a subframe corresponds to a control region to which a control channel is allocated. The other OFDM symbols of the subframe correspond to a data region to which a PDSCH is allocated. DL control channels used in 3GPP LTE include a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe, carrying information about the number of OFDM symbols used for transmission of control channels in the subframe. The PHICH carries a HARQ ACK/NACK signal in response to a UL transmission.

Control information carried on the PDCCH is called Downlink Control Information (DCI). DCI format 0 is defined for UL scheduling, and DCI formats 1, 1A, 1B, 1C, 1D, 2, 2A, 3, and 3A are defined for DL scheduling. Depending on its usage, a DCI format selectively includes information such as a hopping flag, an RB assignment, a Modulation Coding Scheme (MCS), a Redundancy Version (RV), a New Data Indicator (NDI), a Transmit Power Control (TPC), a cyclic shift, a DeModulation Reference Signal (DM RS), a Channel Quality Information (CQI) request, an HARQ process number, a Transmitted Precoding Matrix Indicator (TPMI), Precoding Matrix Indicator (PMI) confirmation, and so on.

The PDCCH delivers a transport format and resource allocation information for a Downlink Shared Channel (DL-SCH), a transport format and resource allocation information for an Uplink Shared Channel (UL-SCH), paging information of a Paging Channel (PCH), system information on the DL-SCH, information about resource al-location for a higher-layer control message such as a random access response transmitted on the PDSCH, a set of Tx power control commands for individual UEs of a UE group, a TPC command, Voice Over Internet Protocol (VoIP) activation indication information, and so on. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel A CCE includes a plurality of REGs. The format of a PDCCH and the number of bits in the PDCCH are determined according to the number of CCEs. An eNB determines a PDCCH format according to control information to be transmitted to a UE and adds a Cyclic Redundancy Check (CRC) to the control information. The CRC is masked by an Identifier (ID) (e.g., a Radio Network Temporary Identifier (RNTI)) according to the owner or usage of a PDCCH. If the PDCCH is directed to a specific UE, its CRC may be masked with a Cell-RNTI (C-RNTI) of the UE. If the PDCCH is for a paging message, the CRC of the PDCCH may be masked with a Paging Radio Network Temporary Identifier (P-RNTI). If the PDCCH delivers system information (more specifically, a System Information Block (SIB)), the CRC may be masked with a System Information RNTI (SI-RNTI). If the PDCCH is for a random access response, the CRC may be masked with a Random Access-RNTI (RA-RNTI).

FIG. 6 is a view illustrating an exemplary DL subframe structure in the 3GPP LTE/LTE-A system as an exemplary wireless communication system.

Referring to FIG. 6, a UL subframe includes a plurality of (two) slots. A slot may include a different number of SC-FDMA symbols according to a CP length. The UL subframe may be divided into a control region and a data region in the frequency domain. A Physical Uplink Shared Channel (PUSCH) carrying user data such as voice is allocated to the data region. A Physical Uplink Control Channel (PUCCH) carrying Uplink Control Information (UCI) is allocated to the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ ACK/NACK: a response signal to a DL data packet on a PDSCH. The HARQ ACK/NACK indicates whether the DL data packet has been received successfully. A 1-bit ACK/NACK is transmitted as a response to a single DL CodeWord (CW) and a 2-bit ACK/NACK is transmitted as a response to two DL CWs.
Channel Quality Indicator (CQI): feedback information for a DL channel MIMO-related feedback information includes an RI, a PMI, a PTI, and so on. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

An FDR system in which UL and DL signals can be transmitted and received simultaneously in the same frequency band has attracted much interest as one of the core technologies of a future 5th Generation (5G) mobile communication system, because it doubles spectral efficiency at maximum, compared to a legacy system in which UL and DL signals are transmitted and received in frequency division or time division.

FDR may be defined as a transmission resource configuration scheme of simultaneously performing transmission and reception in a single transmission frequency band, from the viewpoint of a wireless device. A special example of FDR may be a transmission resource configuration scheme in which a general BS (relay, relay node, or Remote Radio Head (RRH)) simultaneously performs DL transmission and UL reception and a UE simultaneously performs DL reception and UL transmission, in a single frequency transmission band during communication between the BS and the UE. In another example, FDR may be a transmission resource configuration scheme in which transmission and reception take place in the same transmission frequency band between UEs during Device to Device (D2D) communication between the UEs. While the following description is given of proposed FDR-related techniques in the context of wireless transmission and reception between a general BS and a UE, it also covers wireless communication between a wireless network other than a general BS and a UE, and D2D communication between UEs.

FIG. 7 is a conceptual view of Transmission (Tx) and Reception (Rx) links and Self-Interference (SI) in an FDM communication situation.

Referring to FIG. 7, there are two types of SI, direct interference caused by a signal transmitted through a Tx antenna of a BS or UE and then received at an Rx antenna of the BS or UE, and reflected interference caused by a signal reflected from adjacent topography. Due to a physical distance difference, the magnitude of SI is extremely large, compared to a desired signal. That's why it is necessary to effectively cancel SI, for implementation of an FDR system.

To effectively operate the FDR system, Self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power (PA) | Thermal Noise. (BW = 20 MHz) | Receiver NF | Receiver Thermal Noise Level | Self-IC Target (PA-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB(for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW}=-174$ dBm$+10\times\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9. A functional block may be added to or removed from an RF Tx end and an RF Rx end shown in FIG. 9 according to a purpose.

Signal Modeling in FDR System

Because an FDR system uses the same frequency for a Tx signal and an Rx signal, non-linear components of an RF end affect the FDR system significantly. Especially, a Tx signal is distorted by an active device such as a Power Amplifier (PA) and a Low Noise Amplifier (LNA), and the distortion may be modeled as generation of high-order components of a Tx signal. Among the high-order components, an even-order component can be removed effectively by conventional Alternate Coupling (AC) coupling or filtering because the even-order component affects the vicinity of DC. Compared to the even-order component, an odd-order component is not easily removed and has a great influence, because the odd-order component is produced in the vicinity of an existing frequency. In consideration of the non-linearity of the odd-order component, an Rx signal after ADC in the FDR system may be represented as [Equation 1] using a Parallel Hammerstain (PH) Model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n) \quad \text{[Equation 1]}$$

where xD(n) represents desired data to be received, hD(n) represents a desired channel that the desired data experiences, and xSI(n) represents self-transmitted data. hSI.k(n) represents an SI channel that the self-transmitted data experiences. If k is 1, this indicates a linear component, and if k is an odd value equal to or large than 3 indicate a non-linear component. Further, z(n) represents Additive White Gaussian Noise (AWGN).

Need for Non-Linear Self-IC Scheme

To effectively Self-IC of FDR, a non-linear SI channel is required. However, Least Square (LS) estimation used to estimate an SI channel requires matrix inversion. The matrix inversion needs high-complexity computation, and an implementation problem occurs during the matrix inversion according to a matrix size. More specifically, if a non-linear order or the number of multi-path taps, which should be estimated for FDR operation, increases, the size of a matrix to be inverted increases, and the complexity of the matrix inversion also increases to a matrix size to the third power. Thus, the matrix inversion is impossible to perform.

To overcome the high complexity and implementation impossibility of non-linear SI channel estimation, use of a sequence for non-linear SI channel estimation may be considered. More specifically, a high-order component of an SI channel modeled by [Equation 1] may be estimated with low complexity, using the cross-correlation property of a sequence, and this method can be implemented simply, relative to a matrix version. Also, a scheme of estimating a multi-path component corresponding to each order as well as a high-order component of an SI channel, using the auto-correlation and cross correlation properties of a sequence is possible. This scheme may also enable low-complexity SI estimation. Even when a non-linear order and the number of multi-path taps to be estimated for FDR operation are increased, complexity increases linearly in these schemes. Thus, complexity is reduced remarkably and implementation is also possible.

Nonetheless, even though non-linear SI estimation and cancellation is possible with low complexity, as described above, the non-linear SI estimation is still burdensome in terms of insufficient computing power of a UE. Accordingly, there is a need for a scheme of relieving the constraint of Self-IC by controlling the amount of non-linear SI at a system level.

Need for Operating FDR on Subband Basis

Self-IC techniques developed so far are based on FDR operation across a total band. For real FDR implementation, however, it is necessary to use a partial band in FDR according to asymmetric DL/UL data traffic of each UE, instead of a total band. If DL/UL data traffic is constant at each FDR operation, the above scheme is viable.

However, it is typical that the ratio between DL traffic and UL traffic is different, and particularly, there are more DL data traffic than UL data traffic for a UE due to asymmetric DL/UL data traffic. Therefore, it may be efficient for a UE to operate in FDR on a subband basis. That's why per-subband FDR operation is essential during system development.

Overhead of Non-Linear SI Channel Estimation

When RSs are configured for channel estimation in the legacy LTE system, Common RSs or Cell-specific RSs (CRSs), Channel State Information-RSs (CSI-RSs), DeModulation RSs (DMRS), and so on are positioned with a predetermined spacing between them in the time and frequency domains. Then, channel estimation may be performed by various One-Dimensional (1D) or Two-Dimensional (2D) interpolation schemes (block interpolation, linear interpolation, non-linear interpolation, and so on) using demodulated RSs. However, a non-linear component called Inter-Modulation Distortion (IMD) is included in an SI signal in view of the non-linearity of a device in the FDR system. Therefore, if the conventional interpolation schemes are used, IMD components are not reflected, thereby making non-linear SI channel estimation impossible. In this context, there is a need for a non-linear SI channel estimation scheme that considers non-linearity.

In the FDR system, IMD has the following effects. Above all, IMD is produced due to the non-linearity of a device, meaning that an odd term component among high-order components of a Tx signal is generated in the vicinity of the Tx signal.

FIG. 10 is a view illustrating exemplary 3rd IMD components generated in adjacent frequency bands during two-tone transmission.

Referring to FIG. 10, 3rd IMD components generated during transmission of two tones at 1900 MHz and 1900.1 MHz with a spacing of 1 KHz in an OFDM signal are shown empirically. It is noted from FIG. 10 that IMD occurs at 18999.9 MHz and 19000.2 MHz apart from both ends of the transmitted two tones (or RSs) by the frequency difference between the two tones during the two-tone transmission. Based on the result illustrated in FIG. 10, IMD generated during multi-tone transmission of an OFDM signal is illustrated in FIGS. 11 and 12.

FIG. 11 is a view illustrating exemplary 3rd IMD components generated during multi-tone transmission, and FIG. 12 is a graph illustrating power spectral densities (dB) including IMD components in an OFDM system.

Referring to FIGS. 11 and 12, in the case of multi-tone transmission, the number of generated IMD components increases exponentially according to the number and spacing of transmitted tones. Therefore, modeling of multiple tones in the frequency domain is complex because IMD components generated by each tone should be measured and modeled.

For example, if a signal is transmitted in a 20-MHz BW in conformance to the 3GPP LTE standards, a total of 1200 OFDM subcarriers are transmitted, and 719400 (1200× 1199/2) IMD components are generated. Modeling of the IMD components in the frequency domain is complex, and it is impossible to estimate each IMD component in the frequency domain. Accordingly, to estimate a non-linear SI channel in the FDR system, it is necessary to model and estimate the SI channel in the time domain. RS operation in the time domain increases RS overhead.

Power of IMD Component of SI Caused by Non-Linearity of PA

FIG. 13 is a view comparing the power amounts of IMD components at respective tones according to transmission BWs.

As described before, IMD components are included in SI caused by the non-linearity of a PA. The power of the IMD components is proportional to the number of IMD components in each tone. More specifically, FIG. 13 illustrates that the number of IMD components varies with the number of transmitted tones (a subcarrier spacing between tones is maintained).

It may be noted from FIG. 13 that as a Tx BW increases, the number of IMD components generated at the position of each tone also increases. The relative power of IMD components whose number increases with the BW is given as [Equation 2].

$$D_{IMD}(f) = \frac{1}{2}\left\{A_D(f_k)\left(\frac{e\eta_{PD}}{hv}\right)P_r\right\}^2 \quad \text{[Equation 2]}$$

where AD(fK) represents the amplitude of an IMD component generated at the position of a tone fK, e represents electron charge, $\eta_{PD}$ represents Photo Detection (PD) efficiency, h represents a Planck's constant, v represents a center frequency, and Pr represents input power.

$$A_D(f_k) = \frac{3}{4}a_3m_k^3N_{D_2}(f_k) + 3/2a_3m_k^3N_{D_{23}}(f_k) \quad \text{[Equation 3]}$$

where ND2(fK) and ND3(fK) represent the numbers of IMD components generated during two-tone transmission and three-tone transmission, respectively.

As noted from [Equation 2] and [Equation 3], as a BW increases, the resulting increase in the number of IMD components of SI leads to a power increase, and the power increment is proportional to the square of the increase of the number of IMD components.

Hereinbelow, the present invention proposes schemes of effectively applying FDR to wireless transmission between a BS and a UE. The term BS as used across the present specification may cover relay, relay node, RRH, and so on. The present invention proposes resource structures suitable for FDR wireless transmission and related resource mapping methods.

Proposal 1: A PRB mapping rule is established in such a manner that RBGs may be configured by distributing PRBs non-uniformly in order to reduce 3rd IMD.

In the LTE system, an RBG unit varies with a system BW. For the convenience of description, the following description will be given with the appreciation that RBG=4 in the present invention. However, the present invention is not limited to RBG=4, and in other cases, for example, in the case where an RBG includes any other number of RBs as in RBG=2, 3, 4, or 6, the present invention is applicable with a slight modification to an algorithm.

As described before, the power of IMD components of SI caused by the non-linearity of a PA is related to a Tx BW, and PRB mapping of an RBG may be changed as follows to reduce 3rd IMD as in Proposal 1.

A legacy UE (e.g., a UE operating in half-duplex mode) that does not support FDR configures RBGs by sequentially grouping contiguous PRBs in the frequency domain in a conventional localized RBG configuration scheme as defined in 3GPP TS 36.211 6.2.4 Resource-element groups. The resulting SI signal and IMD components of the SI signal are shown in FIG. 14.

FIG. 14 is a view illustrating linear and non-linear SI components at each tone in a conventional RBG configuration rule.

Referring to FIG. 14, linear SI components exist with respect to PRBs #4, #5, #6, and #7, and non-linear SI components, IMD caused by each tone interfere with adjacent PRBs. On the other hand, a Tx BW is reduced and IMD components of each tone may be reduced by separating contiguous PRBs non-uniformly, as illustrated in FIG. 15.

FIG. 15 is a view illustrating linear and non-linear SI components at each tone, when RBGs are configured non-uniformly.

Referring to FIG. 15, linear SI components exist with respect to PRBs #1, #3, #8, and #10, and non-linear SI components, IMD caused by each tone spread even to adjacent PRBs. The total power of a linear SI signal component and a non-linear SI component is equal in the two schemes (the conventional RBG configuration rule, and the non-uniform RBG configuration scheme). However, the power value of IMD generated at each tone differs. That is, it is obvious that IMD power of each tone generated in a proposed RBG is less than IMD power of each tone generated in a conventional RBG. Since PRBs are configured non-uniformly, IMD components may also spread to the positions of a plurality of tones and, as a result, the number of IMD components generated at each tone may be reduced. Accordingly, the IMD power value of each tone may be decreased.

Embodiment 1-1

FIG. 16A is a view illustrating an exemplary method for configuring RBGs by grouping 16 contiguous Physical Resource Blocks (PRBs) for RBG=4 according to a first proposal (Proposal 1) of the present invention, and FIG. 16B illustrates an exemplary PRB mapping table laid out according to FIG. 16A.

FIG. 16A also describes a general formula for generating RBGs by grouping 16 contiguous PRBs. For RBG=4, to configure RBGs by distributing PRBs non-uniformly, RBGs may be configured by grouping each set of PRBs #0, #2, #8, and #10, PRBs #1, #3, #9, and #11, PRBs #4, #6, #12, and #14, and PRBs #5, #7, #13, and #15 into one RBG.

As illustrated in FIG. 16B, PRB indexes may be mapped to RBG indexes in such a manner that PRBs #0, #2, #8, and #10 are mapped to RBG index 0, PRBs #1, #3, #9, and #11 are mapped to RBG index 1, PRBs #4, #6, #12, and #14 are mapped to RBG index 2, and PRBs #5, #7, #13, and #15 are mapped to RBG index 3.

Embodiment 1-2

FIG. 17A is a view illustrating an exemplary method for configuring RBGs by grouping 12 contiguous PRBs for RBG=4 according to Proposal 1 of the present invention, and FIG. 17B illustrates an exemplary PRB mapping table laid out according to FIG. 17A.

Referring to FIG. 17A, for RBG=4, RBGs may be configured by grouping 12 contiguous PRBs in Proposal 1. To configure RBGs by distributing PRBs non-uniformly for RBG=4, RBGs may be configured by grouping each set of PRBs #0, #2, #5, and #7, PRBs #1, #3, #8, and #10, and PRBs #4, #6, #9, and #11 into one RBG.

As illustrated in FIG. 17B, PRB indexes may be mapped to RBG indexes in such a manner that PRBs #0, #2, #5, and #7 are mapped to RBG index 0, PRBs #1, #3, #8, and #10 are mapped to RBG index 1, and PRBs #4, #6, #9, and #11 are mapped to RBG index 2.

Embodiment 1-3

FIG. 18A is a view illustrating an exemplary method for configuring RBGs by grouping 64 contiguous PRBs for RBG=4 according to a Proposal 1 of the present invention, and FIG. 18B illustrates an exemplary PRB mapping table laid out according to FIG. 18A.

FIG. 18A also describes a general formula for generating RBGs by grouping 64 contiguous PRBs. To configure RBGs by distributing PRBs non-uniformly for RBG=4, RBGs may be configured by grouping each set of PRBs #0, #8, #35, and #43, PRBs #1, #9, #34, and #42, PRBs #2, #10, #33, and #41, and PRBs #3, #11, #32, and #40 into one RBG.

As illustrated in FIG. 18B, PRB indexes may be mapped to RBG indexes in such a manner that PRBs #0, #8, #35, and #43 are mapped to RBG index 0, PRBs #1, #9, #34, and #42 are mapped to RBG index 1, PRBs #2, #10, #33, and #41 are mapped to RBG index 2, and PRBs #3, #11, #32, and #40 are mapped to RBG index 3.

Embodiment 1-4

FIG. 19A is a view illustrating an exemplary method for configuring RBGs by grouping 48 contiguous PRBs for RBG=4 according to a Proposal 1 of the present invention, and FIG. 19B illustrates an exemplary PRB mapping table laid out according to FIG. 19A.

FIG. 19A also describes a general formula for generating RBGs by grouping 48 contiguous PRBs. To configure RBGs by distributing PRBs non-uniformly for RBG=4, RBGs may be configured by grouping each set of PRBs #0, #8, #35, and #43, PRBs #1, #9, #34, and #42, PRBs #2, #10, #33, and #41, and PRBs #3, #11, #32, and #40 into one RBG.

As illustrated in FIG. 19B, PRB indexes may be mapped to RBG indexes in such a manner that PRBs #0, #8, #35, and #43 are mapped to RBG index 0, PRBs #1, #9, #34, and #42 are mapped to RBG index 1, PRBs #2, #10, #33, and #41 are mapped to RBG index 2, and PRBs #3, #11, #32, and #40 are mapped to RBG index 3.

The above examples illustrate PRB mapping results for RBG=4. However, as described before, even though an RBG is configured to include a different number of PRBs or in a different size, PRBs may be grouped non-uniformly in consideration of IMD components, thereby reducing IMD.

Proposal 2: If each RBG includes three or fewer PRBs, PRB mapping may be performed using a subset of a set of 4 PRBs or in a new PRB mapping rule.

For RBGs each including three or fewer PRBs (RBG=2 or 3), PRBs may be mapped in the following embodiments based on the foregoing embodiments in which each RBG includes four PRBs. For RBG=2, PRB mapping may be performed by selecting a part of the embodiments of Proposal 1, and for RBG=3, resources may be allocated according to a new PRB mapping rule in order to increase a resource use rate.

Embodiment 2-1

For RBG=2, PRB mapping may be performed by selecting two PRBs out of four PRBs in Embodiment 1-1, Embodiment 1-2, Embodiment 1-3, and Embodiment 1-4 according to Proposal 2.

If two PRBs are selected out of four PRBs grouped into one RBG in Embodiment 1-1, Embodiment 1-2, Embodiment 1-3, and Embodiment 1-4, a total of six methods (PRBs #1 and #2, PRBs #1 and #3, PRBs #1 and #4, PRBs #2 and #3, PRBs #2 and #4, and PRBs #3 and #4) are available. However, it is preferred to select PRBs #1 and #2 in a pair as follows, in consideration of efficiency of PRB resources and IMD effects.

FIG. 20A is a view illustrating an exemplary PRB mapping of two PRBs selected from among four PRBs for RBG=2 in Embodiment 1-1, Embodiment 1-2, Embodiment 1-3, and Embodiment 1-4 according to a second proposal (Proposal 2) of the present invention, and FIG. 20B is an exemplary PRB mapping table laid out according to FIG. 20A.

FIG. 20A also describes a general formula for generating RBGs by grouping 12 contiguous PRBs. To configure RBGs by distributing PRBs non-uniformly for RBG=2, each pair of PRBs #0 and #2, PRBs #1 and #3, PRBs #4 and #6, PRBs #5 and #7, PRBs #8 and #10, and PRBs #9 and #11 may be grouped into one RBG.

Referring to FIG. 20B, PRB indexes may be mapped to RBG indexes in such a manner that PRBs #0 and #2 are mapped to RBG index 0, PRBs #1 and #3 are mapped to RBG index 1, PRBs #4 and #6 are mapped to RBG index 2, PRBs #5 and #7 are mapped to RBG index 3, PRBs #8 and #10 are mapped to RBG index 4, and PRBs #9 and #11 are mapped to RBG index 5.

Apart from Embodiment 2-1, the remaining five combinations (PRB #1/#3, PRB #1/#4, PRB #2/#3, PRB #2/#4, PRB #3/#4) out of the six combinations are also available.

Embodiment 2-2

For RBG=3, PRB mapping may be performed by selecting three PRBs out of four PRBs grouped into each RBG in Embodiment 1-1, Embodiment 1-2, Embodiment 1-3, and Embodiment 1-4.

As described above, a total of four methods (PRBs #1, #2, and #3, PRBs #1, #2, and #4, PRBs #1, #3, and #4, PRBs #2, #3, and #4) are available to perform PRB mapping by selecting three PRBs out of four PRBs grouped into each RBG in Embodiment 1-1, Embodiment 1-2, Embodiment 1-3, and Embodiment 1-4.

Embodiment 2-3

For RBG=3, a new PRB mapping rule may be established in order to increase the efficiency of resources of Embodiment 2-2.

FIG. 21A is a view illustrating an exemplary method for configuring RBGs by grouping 12 contiguous PRBs for RBG=3 according to Proposal 2 of the present invention, and FIG. 21B illustrates an exemplary PRB mapping table laid out according to FIG. 21A.

FIG. 21A also describes a general formula for generating RBGs by grouping 12 contiguous PRBs. To configure RBGs by distributing PRBs non-uniformly for RBG=3, each set of PRBs #0, #2, and #5, PRBs #1, #3, and #7, PRBs #4, #8 and #10, and PRBs #6, #9 and #11 may be grouped into one RBG.

Referring to FIG. 21B, PRB indexes may be mapped to RBG indexes in such a manner that PRBs #0, #2, and #5 are mapped to RBG index 0, PRBs #1, #3, and #7 are mapped to RBG index 1, PRBs #4, #8 and #10 are mapped to RBG index 2, and PRBs #6, #9 and #11 are mapped to RBG index 3.

Proposal 3: A PRB mapping rule is established so that RBGs are configured by grouping every n PRBs (subgroup PRB=n) into one RBG in order to reduce 3rd IMD.

In Proposal 1, IMD is determined by separating every PRB non-uniformly. However, if the number of RBGs increases, non-uniform distributed PRB mapping like Proposal 1 is not easy. Moreover, even though PRBs may be distributed non-uniformly, there may exist non-mapped PRBs. To prevent the presence of non-mapped PRBs, a PRB mapping rule may be established by setting subgroup PRB=n by grouping every n PRBs into one RBG and thus distributing PRBs non-uniformly on a subgroup basis.

Embodiment 3-1

For RBG=6, RBGs may be configured by grouping 24 contiguous PRBs with subgroup PRB=2 according to Proposal 2.

FIG. 22A is a view illustrating an exemplary method for configuring RBGs by grouping 24 contiguous PRBs for RBG=6 according to a third proposal (Proposal 3) of the present invention, and FIG. 22B is an exemplary PRB mapping table laid out according to FIG. 22A.

FIG. 22A also describes a general formula for generating RBGs by grouping 12 contiguous PRBs with subgroup PRB=2 (subgroups each having two PRBs are configured).

To configure RBGs by distributing PRBs non-uniformly for RBG=6, each set of PRBs #0, #1, #4, #5, #14, and #15, PRBs #2, #3, #12, #13, #16, and #17, PRBs #6, #7, #10, #11, #20, and #21, and PRBs #8, #9, #18, #19, #22 and #23 may be grouped into one RBG.

Referring to FIG. 22B, PRB indexes may be mapped to RBG indexes in such a manner that PRBs #0, #1, #4, #5, #14, and #15 are mapped to RBG index 0, PRBs #2, #3, #12, #13, #16, and #17 are mapped to RBG index 1, PRBs #6, #7, #10, #11, #20, and #21 are mapped to RBG index 2, and PRBs #8, #9, #18, #19, #22 and #23 are mapped to RBG index 3.

Embodiment 3-1 illustrates PRB mapping results for RBG=6. However, as described before, even though an RBG is configured to include a different number of PRBs or in a different size, a plurality of subgroup PRBs may be grouped non-uniformly in con-sideration of IMD components, thereby reducing IMD.

According to Proposal 1, Proposal 2, and Proposal 3, if an eNB indicates RBG indexes to a UE by DCI/UCI, the UE may determine PRB indexes mapped to the RBG indexes, referring to a PRB mapping table that maps PRB indexes to RBG indexes, and thus determine resource allocation positions for PDSCH reception and resource allocation positions for PUCCH/PUSCH transmission. The RBG indexes may be signaled in a bitmap.

Proposal 4: An RB gap value may be configured for distributed resource allocation in Proposal 1.

As defined in 3GPP TS 36.213 Table 7.1.6.1-1, RBG sizes are set according to system BWs (the number of DL RBs should be a multiple of an RBG size for a corresponding system BW).

[Table 2] lists type 0 resource allocation RBG sizes for DL system BWs in 3GPP TS 36.213 Table 7.1.6.1-1.

TABLE 2

| System Bandwidth $N_{RB}^{DL}$ | RBG Size (P') |
|---|---|
| ≤10 | 1 |
| 11-26 | 2 |
| 27-63 | 3 |
| 64-110 | 4 |

As defined in 3GPP TS 36.211 6.2.3.2-1, RB gap values are set for system BWs, for distributed resource allocation.

TABLE 3

| System BW ($N_{RB}^{DL}$) | Gap ($N_{gap}$) | |
|---|---|---|
| | 1st Gap ($N_{gap, 1}$) | 2nd Gap ($N_{gap, 2}$) |
| 6-10 | [$N_{RB}^{DL}/2$] | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

However, in the case where resources are allocated with 12 or 16 contiguous PRBs for PRB mapping as in Proposal 1, if an RB gap for distributed resource allocation in [Table 3] is added, the number of PRBs may be exceeded and thus resources may not be allocated in some cases. For example, if a system BW includes 27 RBs and a PRB mapping unit is 12 RBs, an RB gap for distributed resource allocation is 18. Then if PRBs #4, #6, #9, and #11 are allocated to a UE, a PRB number to which the RB gap is added is #29, larger than an actual PRB value. Therefore, there is a need for a table listing different RB gap values from [Table 3] for 3GPP LTE in the foregoing proposals supporting FDR.

Embodiment 4-1

If RBGs are configured in a PRB mapping rule with four or more contiguous PRBs for FDR in Proposal 1 and Proposal 2 (Embodiment 1-1), RB gap values may be configured as listed in [Table 4]. [Table 4] is a table listing RB gap values available in an FDR environment.

TABLE 4

| System BW ($N_{RB}^{DL}$) | Gap ($N_{gap}$) | |
|---|---|---|
| | 1st Gap ($N_{gap, 1}$) | 2nd Gap ($N_{gap, 2}$) |
| 6-10 | [$N_{RB}^{DL}/2$] | N/A |
| 11 | 4 | N/A |
| 12-19 | 8 | N/A |
| 20-26 | <12 | N/A |
| 27-44 | <18 | N/A |
| 45-49 | <27 | N/A |
| 50-63 | <27 | N/A or <9 |
| 64-79 | <32 | N/A or <16 |
| 80-110 | <48 | N/A or <16 |

In a 5G communication system New RAT (NR), an RB gap may be changed according to an RBG size which is defined based on a system BW.

To achieve Self-IC performance required to operate a feasible FDR system, various combinations of antenna Self-IC, analog Self-IC, and digital Self-IC are essential. In general, it is necessary to match each Self-IC scheme in order to achieve Self-IC performance based on various-domain schemes. Analog Self-IC in the analog domain should designed according to antenna Self-IC performance in the antenna domain. Then, digital Self-IC in the digital domain should be designed according to Self-IC performance in the antenna/analog domain.

For example, if a balun is used for analog Self-IC in the FDR system, balun frequency responses have a frequency selective property as illustrated in FIG. 23.

FIG. 23 is a graph illustrating balun frequency responses.

As illustrated in FIG. 23, balun frequency responses have a difference of up to 15 dB according to subcarrier indexes. A frequency-selective residual SI signal after balun-based analog Self-IC causes performance degradation of digital Self-IC. The performances are illustrated in FIGS. 24 and 25.

FIG. 24 is a graph illustrating Bit Error Rate (BER) performance, when digital Self-IC is performed after analog Self-IC using a balun having ideal performance, and FIG. 25 is a graph illustrating BER performance, when digital Self-IC is performed after analog Self-IC using baluns having 5 dB isolation degradation and 15 dB isolation degradation, respectively. (a) of FIG. 25 illustrates the case of 5-dB isolation degradation, and (b) of FIG. 25 illustrates the case of 15-dB isolation degradation.

A comparison of three curves in each of FIGS. 24 and 25 reveals that in the case of analog Self-IC using an ideal balun (having a frequency-flat frequency response property), when analog Self-IC is 30 dB (CRF=30 dB) and Tx power is 10 dBm, a BER performance of −40 dB results. On the other hand, in the case of analog Self-IC using baluns having 5-dB isolation degradation and 15-dB isolation degradation as illustrated in FIG. 25, the frequency selective phenomenon of the resulting residual SI signal leads to much Self-IC performance degradation, as noted from the two graphs of FIG. 25.

Even in the case of analog Self-IC of 60 dB (CRF=60 dB), when Tx power is 10 dBm, BER performance is degraded compared to the case of using an ideal balun, as illustrated in (a) of FIG. 25. Even in the case of analog Self-IC of 80 dB (CRF=80 dB), when Tx power is 10 dBm, BER performance is degraded compared to the case of using an ideal balun, as illustrated in (b) of FIG. 25.

Further, when antenna/analog Self-IC is performed in an analog Self-IC scheme that generates an RS using various combinations of a rat race coupler, a phase shifter, an attenuator, and a true time delay device, a residual SI signal is also frequency-selective due to the frequency-selective property of the phase shifter, the attenuator, and the true time delay device.

FIG. 26 is a graph illustrating Self-IC levels after 1-Tx and 2-Rx antenna Self-IC and analog Self-IC are performed using a rat race coupler.

Referring to FIG. 26, analog Self-IC performance corresponding to a 80-MHz BW does not have frequency-flat performance. Therefore, a residual SI signal produced after antenna/analog Self-IC is also frequency selective, and an up to 15-dB difference is generated according to frequency bands, thus causing performance degradation of digital Self-IC as in the foregoing balun case.

FIG. 27 is a graph illustrating Self-IC levels after 2-Tx and 2-Rx antenna Self-IC and analog Self-IC are performed using a rat race coupler.

In an extended multi-antenna FDR system with 2-Tx and 2-Rx, analog Self-IC performance corresponding to a 80-MHz BW does not have frequency-flat performance, as illustrated in FIG. 27. Therefore, a residual SI signal produced after antenna/analog Self-IC is also frequency selective. As illustrated in FIG. 27, an up to 15-dB difference is generated according to frequency bands in simulated results.

In general, the most efficient method with high expected performance for resource allocation in a multi-carrier system such as OFDM is to allocate resources at subcarriers with a high channel gain based on a transmission channel (DL/UL channel). In the FDR system, the power of a residual SI signal after Self-IC during reception as well as a transmission channel is very important. Subcarriers are allocated in consideration of resources offering the highest performance (a frequency area with the highest antenna/analog Self-IC performance) and a transmission channel (DL/UL channel) by measuring not average but instantaneous antenna/analog Self-IC performance.

However, the value of a residual SI signal measured in the digital domain is performance after digital Self-IC. Moreover, the value of the residual SI signal reflects channel fluctuation, it is impossible to measure only antenna/analog Self-IC performance However, because it is known that there are a frequency area with high average power of a residual SI signal and a frequency area with low average power of a residual SI signal due to the frequency selectivity of antenna/analog Self-IC, as described before, resource allocation using the average information may offer higher performance than random resource allocation.

Proposal 5: Allocation of RBG resources based on an average Self-IC performance determined on a frequency basis may be considered as a method for allocating a plurality of RBG resources to a UE supporting FDR mode.

FIG. 28 is a graph illustrating regions divided based on average antenna/analog Self-IC performances in a 2×2 Multiple Input Multiple Output (MIMO) FDR mode with a 80-MHz BW from a center frequency of 2.52 GHz.

As described before, since instantaneous antenna/analog Self-IC performance cannot be determined, regions may be defined in a frequency band according to average antenna/analog Self-IC performances, and RBG resources may be allocated according to the regions, as illustrated in FIG. 28. The present proposal will be described based on the results of FIG. 28 in which the power of a residual SI signal around the center frequency is lower than at an edge frequency by 14 dB.

As illustrated in FIG. 28, a high Self-IC (SIC) region and a low SIC region may be defined based on a predetermined Self-IC performance threshold, in each subband. RBGs may be sequentially allocated as follows according to the number of RBGs allocated to an FDR-mode UE and the number of FDR-mode UEs in a cell.

For example, in the case where the number of RBGs for an FDR-mode UE is 1, if the number of allocated FDR-mode UEs is less than a threshold, the FDR-mode UEs may be allocated first to the high SIC region, and otherwise, the FDR-mode UEs may be allocated to all frequency regions.

In another example, in the case where the number of RBGs for an FDR-mode UE is 2, if the number of allocated FDR-mode UEs is less than the threshold, one of two RBGs may be allocated to the high SIC region, and the other RBG may be allocated to the low SIC region. Or the RBGs may be allocated using a distributed PRB mapping table of Proposal 4. If the number of allocated FDR-mode UEs is larger than the threshold, both of the RBGs may be allocated to all frequency regions.

In another example, in the case where the number of RBGs for an FDR-mode UE is 3 or larger, if the number of allocated FDR-mode UEs is less than the threshold, RBGs may be allocated to the FDR-mode UEs, referring to the distributed PRB mapping table of Proposal 4. If the number of allocated FDR-mode UEs is larger than the threshold, all RBGs for the FDR-mode UEs may be allocated to the high SIC region.

A criterion with which to determine whether the number of allocated FDR-mode UEs is large or small may be changed according to a system bandwidth. That is, in the case of a resource allocation scheme that measures interference between UEs and enables the interference to be avoided, it may be determined that the number of allocated FDR-mode UEs is less than a threshold, and otherwise, it may be determined that the number of allocated FDR-mode UEs is larger than the threshold.

Proposal 6: To support the schemes of Proposal 1 to Proposal 5 for IMD reduction during FDR operation, a BS may implicitly indicate resource allocation information to a UE by adding an indicator (e.g., a flag) indicating FDR-mode resource allocation in DCI or UCI of a PDCCH, or a PCFICH, or signal FDR-mode DCI/UCI for FDR support to the UE.

In Proposal 6, unless the BS allocates resources on a PRB basis, the BS may not transmit resource allocation information to a UE using the legacy DCI/UCI/PCFICH. Therefore, signaling for the UE is required to support the schemes of Proposal 1 to Proposal 5.

Embodiment 6-1

The BS may signal an additional resource allocation indicator (e.g., flag) for FDR in the legacy DCI/UCI/PC-FICH to the UE.

As the BS signals the additional resource allocation indicator (e.g., flag) for FDR in the legacy DCI/UCI format to the UE, the UE may determine the positions of a DL grant/UL grant and allocated PRB resources based on RBG indexes in Proposal 1 to Proposal 5.

If the resource allocation indicator (e.g., flag) for FDR mode in the DCI/UCI is false, this means that resources are allocated in a conventional RBG mapping rule.

If the resource allocation indicator (e.g., flag) for FDR mode in the DCI/UCI is true, this means that resources are allocated in an RBG mapping rule for IMD reduction.

Further, if the resource allocation indicator (e.g., flag) for FDR mode is added to the legacy PCIFIC, the UE may determine the positions of allocated PRB resources of a PUCCH based on RBG indexes in Proposal 1 to Proposal 5. This operation will be performed as follows.

If the resource allocation indicator (e.g., flag) for FDR mode in the PCFICH is false, this means that resources are allocated in a conventional RBG mapping rule for the PUCCH.

If the resource allocation indicator (e.g., flag) for FDR mode in the PCFICH is true, this means that resources are allocated in an RBG mapping rule for IMD reduction for the PUCCH.

Herein, the DCI/UCI includes RBG indexes for FDR-mode UEs. The DCI/UCI may indicate the RBG indexes in a bitmap pattern. An FUR-mode UE may determine PRB indexes for DL reception/UL transmission based on the RBG indexes indicated by the DCI/UCI, referring to a table mapping PRB indexes to RBG indexes as proposed in the present invention. The FDR-mode UE may perform DL reception/UL transmission in PRBs corresponding to the PRB indexes.

Embodiment 6-2

The BS may signal resource allocation information to a UE in DCI/UCI for FDR mode, configured to support the FDR mode.

The DCI/UCI for FDR mode may indicate power control for FDR mode and RS support or non-RS support for Self-IC and Inter-Device Interference (IDI) measurement, as well as the afore-described resource allocation indicator (e.g., flag) for FDR mode. The DCI/UCI for FDR mode includes the following information.

The DCI for FDR mode may include the following information.

(1) Legacy DCI
(2) Whether operation is performed in FDR mode
(3) DL resource allocation information (RBG indexes or the like) for FDR mode
(4) FDR control information (power control information, Modulation and Coding Scheme (MCS) offset information, rank offset information, and so on)
(5) Whether RS mapping for Self-IC and IDI measurement is supported The UCI for FDR mode may include the following information.

(1) Legacy DCI
(2) Whether operation is performed in FDR mode
(3) UL resource allocation information (RBG indexes or the like) for FDR mode
(4) FDR control information (power control information, Modulation and Coding Scheme (MCS) offset information, rank offset information, and so on)
(5) Whether RS mapping for Self-IC and IDI measurement is supported The DCI/UCI may include RBG indexes for FDR-mode UEs. The DCI/UCI may indicate the RBG indexes in a bitmap pattern. An FUR-mode UE may determine PRB indexes for DL reception/UL transmission based on the RBG indexes indicated by the DCI/UCI, referring to a table mapping PRB indexes to RBG indexes as proposed in the present invention. The FDR-mode UE may perform DL reception/UL transmission in PRBs corresponding to the PRB indexes.

Aside from the above information, signaling to be changed for FDR-mode operation may be included in the DCI/UCI for FDR-mode.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and apparatus for receiving resource allocation information in a wireless communication system may be used industrially in various wireless communication systems such as a 3GPP LTE/LTE-A system and a 5G communication system.

The invention claimed is:

1. A method of receiving resource allocation information by a user equipment in a wireless communication system, the method comprising:
receiving, from a base station, control information including downlink resource allocation information,
wherein the downlink resource allocation information includes information on at least one first Resource Block Group (RBG) allocated to the user equipment, each of the at least one first RBG being a set of a plurality of non-contiguous Resource Blocks (RBs) in a frequency domain, and
receiving, from the base station, downlink data based on the downlink resource allocation information,
wherein a plurality of RBs allocated to the user equipment are grouped into subgroups and mapped to the at least one first RBG based on the subgroups, and
wherein, based on the number of the at least one first RBG being 2, RBs included in one RBG are positioned in a frequency region having a self-interference cancellation performance higher than a threshold in a system bandwidth, and RBs included in the other RBG are positioned in a frequency region having a self-interference cancellation performance lower than the threshold in the system bandwidth.

2. The method according to claim 1, wherein the downlink data is received based on the downlink resource allocation information and the RBs included in the at least one first RBG.

3. The method according to claim 1, wherein, based on the number of the at least one first RBG being 1, the RBs are positioned in a frequency region having a self-interference cancellation performance higher than a threshold or all frequency regions in a system bandwidth.

4. The method according to claim 3, wherein the frequency region having the self-interference cancellation performance higher than the threshold in the system bandwidth is within a predetermined range from a center frequency.

5. The method according to claim 1, wherein, based on the number of the at least one first RBG being 2, positions of the RBs are determined based on a distributed resource allocation rule.

6. The method according to claim 1, wherein the control information further includes information for informing whether Reference Signal (RS) mapping for self-interference cancellation performance in a Full Duplex Radio (FDR) mode is supported.

7. The method according to claim 1, wherein the control information further includes uplink resource allocation information, and the uplink resource allocation information includes information on at least one second RBG,
the method further comprising:
transmitting uplink data based on RBs included in the at least one second RBG.

8. A user equipment for receiving resource allocation information in a wireless communication system, the user equipment comprising:
a receiver; and
a processor,
wherein the processor is configured to control the receiver to:
receive, from a base station, control information including downlink resource allocation information, wherein the downlink resource allocation information includes information on at least one first Resource Block Group (RBG) allocated to the user equipment, each of the at least one first RBG is a set of a plurality of non-contiguous Resource Blocks (RBs) in a frequency domain, and receive, from the base station, downlink data based on the downlink resource allocation information, wherein a plurality of RBs allocated to the user equipment are grouped into subgroups and mapped to the at least one first RBG based on the subgroups, and wherein, based on the number of the at least one first RBG being 2, RBs included in one RBG are positioned in a frequency region having a self-interference cancellation performance higher than a threshold in a system bandwidth, and RBs included in the other RBG are positioned in a frequency region having a self-interference cancellation performance lower than the threshold in the system bandwidth.

9. The user equipment according to claim 8, wherein the processor is configured to control the receiver to receive the downlink data based on the downlink resource allocation information and the RBs included in the at least one first RBG.

10. The user equipment according to claim 8, wherein, based on the number of the at least one first RBG being 1, the RBs are positioned in a frequency region having a self-interference cancellation performance higher than a threshold or all frequency regions in a system bandwidth.

11. The user equipment according to claim 10, wherein the frequency region having the self-interference cancellation performance higher than the threshold in the system bandwidth is within a predetermined range from a center frequency.

12. The user equipment according to claim 8, wherein, based on the number of the at least one first RBG being 2, positions of the RBs are determined based on a distributed resource allocation rule.

13. The user equipment according to claim 8, further comprising a transmitter, wherein the control information further includes uplink resource allocation information, and the uplink resource allocation information includes information on at least one second RBG, and wherein the processor is further configured to control the transmitter to transmit uplink data based on RBs included in the at least one second RBG.

14. The user equipment according to claim 8, wherein the control information further includes information for informing whether Reference Signal (RS) mapping for self-interference cancellation performance in Full Duplex Radio (FDR) mode is supported.

* * * * *